US006987512B2

(12) United States Patent
Robertson et al.

(10) Patent No.: US 6,987,512 B2
(45) Date of Patent: Jan. 17, 2006

(54) 3D NAVIGATION TECHNIQUES

(75) Inventors: George G. Robertson, Seattle, WA (US); Mary P. Czerwinski, Woodinville, WA (US); Desney Tan, Pittsburgh, PA (US)

(73) Assignee: Microsoft Corporation, Redmond, WA (US)

(*) Notice: Subject to any disclaimer, the term of this patent is extended or adjusted under 35 U.S.C. 154(b) by 665 days.

(21) Appl. No.: 09/821,126

(22) Filed: Mar. 29, 2001

(65) Prior Publication Data

US 2002/0140698 A1 Oct. 3, 2002

(51) Int. Cl.
*G06T 15/00* (2006.01)

(52) U.S. Cl. .................. 345/427; 345/419; 345/421; 345/156; 345/165; 345/580; 345/581; 434/32; 463/32

(58) Field of Classification Search ............... 345/419, 345/421, 427, 156, 163, 850, 851; 434/32, 434/51; 463/32
See application file for complete search history.

(56) References Cited

U.S. PATENT DOCUMENTS

| | | | |
|---|---|---|---|
| 5,107,443 A | 4/1992 | Smith et al. ............... 395/158 |
| 5,276,785 A | 1/1994 | Mackinlay et al. ......... 395/127 |
| 5,555,354 A * | 9/1996 | Strasnick et al. ........... 345/427 |
| 5,608,850 A | 3/1997 | Robertson .................. 395/127 |
| 5,689,628 A | 11/1997 | Robertson .................. 395/127 |
| 6,064,393 A * | 5/2000 | Lengyel et al. ............. 345/427 |
| 6,094,196 A | 7/2000 | Berry et al. ................ 345/355 |
| 6,154,723 A | 11/2000 | Cox et al. .................. 704/270 |
| 6,157,747 A | 12/2000 | Szeliski et al. ............. 382/284 |
| 6,330,008 B1 * | 12/2001 | Razdow et al. ............. 715/772 |
| 6,344,861 B1 * | 2/2002 | Naughton et al. .......... 715/769 |

OTHER PUBLICATIONS

Robert Zeleznik and Andrew Forsberg. UniCam—2D Gestural Camera Controls for 3D Environments. In Proceedings of the 1999 symposium on Interactive 3D Graphics. ACM SIGGRAPH, 1999, pp. 169–173.*

Bederson, B., et al., "Pad++: A Zoomable Graphical Sketchpad for Exploring Alternate Interface Physics", *Journal of Visual Languages and Computing*, (1996) 7, p. 3–13.

Bowman, D., et al., "Travel in Immersive Virtual Environments: An Evaluation of Viewpoint Motion Control Techniques", *Proceedings of the 1997 Virtual Reality Annual International Symposium (VRAIS)*, p. 45–52.

Chapman, D., et al., "Manipulating the Future: Predictor Based Feedback for Velocity Control in Virtual Environment Navigation", *Proceedings of the 1992 Symposium on Interactive 3D Graphics*, 1992, p. 63–66.

Cohen, J., et al., "Harold: A World Made of Drawings", *Proceedings of the First International Symposium on Non-Photorealistic Animation and Rendering*, 2000, 1–8.

Darken, R., et al., "A Toolset for Navigation in Virtual Environments", *Proceedings of the UIST '93, ACM Press*, p. 157–165.

(Continued)

*Primary Examiner*—Kimbinh T. Nguyen
(74) *Attorney, Agent, or Firm*—Amin & Turocy, LLP

(57) ABSTRACT

A system and method is provided for facilitating navigation techniques in a three-dimensional virtual environment. The present invention couples input driving techniques to the state of one or more workspace variables (e.g., object state, virtual body state, environment state) to change the user's viewing context within a single input control motion. Modification of the user's viewing context allows navigation to various positions and orientations with out the need to be provided with that viewing context prior to navigation. The modification of the user's viewing context also allows for single input motion employing the same input drive controls.

76 Claims, 13 Drawing Sheets

OTHER PUBLICATIONS

Darken, R., et al., "Navigating Large Virtual Spaces", *The International Journal of Human–Computer Interaction*, 8 (1), 1996, p. 49–72.

Elvins, T., et al., "Worldlets: 3D Thumbnails for 3D Browsing", *Proceedings on CHI '98, ACM Press*, 163–170.

Fukatsu, S., et al., "Intuitive Control of Bird's Eye Overview Images for Navigation in an Enormous Virtual Environment", *Proceedings of the 1998 ACM Symposium on Virtual Reality Software and Technology*, p. 67–76.

Furnas, G., "Generalized Fisheye Views", *Proceedings of CHI '86, ACM Press*, p. 16–23.

Furnas, G., "Effective View Navigation", *Proceedings of CHI '97, ACM Press*, p. 367–374.

Gleicher, M., et al., "Through–the–lens Camera Control", *Computer Graphics, 26, Jul. 1992, ACM Press*, p. 331–340.

Hunt, E., et al., "Orientation and Wayfinding: A Review", *ONR Technical Report*, N00014–96–0380, 1990, p. 1–83.

Igarashi, T., et al., "Path Drawing for 3D Walkthrough", *Proceedings of UIST '98, ACM Press*, p. 173–174.

Igarashi, T., et al., "Speed–Dependent Automatic Zooming for Browsing Large Documents", *Proceedings of UIST 2000, ACM Press*, p. 139–148.

Jul, S., et al., "Critical Zones in Desert Fog: Aids to Multiscale navigation", *Proceedings of UIST '98, ACM Press*, p. 97–106.

Mackinlay, J., et al., "Rapid Controlled Movement Through A Virtual 3D Workspace", *Proceedings of SIGGRAPH '90, ACM Press*, Computer Graphics, vol. 24, No. 4, Aug. 1999, p. 171–176.

Mackinlay, J., et al., "The Perspective Wall: Detail and Context Smoothly Integrated", *Proceedings of hte CHI '91, ACM Press*, p. 173–179.

Masui, T., et al., "Multiple–view Approach for Smooth Information Retrieval", *Proceedings of UIST '95, ACM Press*, p. 199–206.

Patrick, E., et al., "Using A Large Projection Screen as an Alternative To Head–Mounted Displays for Virtual Environments", *Proceedings of CHI 2000, ACM Press*, Apr. 1–6, 2000, p. 478–485.

Robertson, G., et al., "Immersion in Desktop Virtual Reality", *Proceedings of UIST '97, ACM Press*, p. 11–19.

Robertson, G., et al., "The Document Lens", *Proceedings of UIST '93, ACM Press*, Nov. 3–5, p. 101–108.

Robinett, W., et al., "Implementation of Flying, Scaling and Grabbing in Virtual Worlds", *Proceedings of the 1992 Symposium on Interactive 3D Graphics*, p. 189–192.

Ruddle, R., et al., "The Effects of Maps on Navigation and Search Strategies in Very–Large–Scale Virtual Environments", *Journal of Experimental Psychology: Applied*, vol. 5, No. 1, 1999, p. 54–75.

Siegel, A., et al., "The Developement of Spatial Representations of Large–Scale Environments", In H. Reese (Ed.) *Advanced in Child Development and Behavior*, 10, New York: Academi Press, p. 10–55.

Song, D., et al., "Non–linear Interactive Motion Control Techniques for Virtual Space Navigation", *Proceedings of 1993 IEEE Virtual Reality Symposium, IEEE Computer Society*, p. 111–117.

Stoakley, R., et al., "Virtual Reality on a WIM: Interactive Worlds in Miniature" *Proceedings of CHI '95, ACM Press*, p. 1–12.

Thorndyke, P., et al., "Differences in Spatial Knowledge Acquired from Maps and Navigation", *Cognitive Psychology*, 14, 1982, p. 560–589.

Vinson, N., et al., "Design Guidelines for Landmarks to Support Navigation in Virtual Environments" *Proceedings of CHI '99, ACM Press*, May 1999, p. 278–285.

Ware, C., et al., "Context Sensitive Flying Interface", *Proceedings of hte 1997 Symposium on Interactive 3D Graphics*, p. 127.

Witmer, B., et al., "Virtual Space and Real World Places: Transfer of Route Knowledge", *International Journal of Human–Computer Studies*, 45, 1999, p. 413–428.

Colin Ware, et al., Exploration and Virtual Camera Control in Virtual Three Dimensional Environments, Proceedings of the 1990 symposium on Interactive 3D graphics, 1990, pp. 175–183.

\* cited by examiner

3D NAVIGATION TECHNIQUES

TECHNICAL FIELD

The present invention relates to user interactive three-dimensional (3D) workspaces and in particular to a system and method for navigating, searching and inspecting within a 3D environment.

BACKGROUND OF THE INVENTION

Most virtual environments include more space than can be viewed from a single focal point. Therefore, a 3D world is only as useful as a user's ability to move around and interact with information within that world. Users must be provided with the ability to navigate through the environment in order to obtain different views to investigate various scenes and objects within the virtual surroundings. The most common techniques of navigating through a 3D virtual world are computer mouse or joystick driven techniques. Forward or backward movement of a computer mouse or joystick provides the user with the illusion of moving a virtual body or camera forward or backward through the virtual environment. Left or right movement turns the body or camera left or right in the virtual environment. The virtual body or camera changes in position or orientation within the 3D graphical workspace to give the user a sensation of moving within the 3D graphical space. The problem is that if an object that the user desires to reach is a long distance from the location of the virtual body or camera, it takes a long time for the user to get to the object unless a built in acceleration mechanism is provided. The problem with built in acceleration mechanisms, is that the user has the tendency to overshoot the object and then must backtrack to the location of the object.

Numerous techniques have been employed to try to maximize the utility of display space to view existing information within the 3D environment. For example, in some virtual environment applications, the user is given the ability to zoom in and out and work at multiple scales for virtually expanding the viewing space. Mechanisms have been provided to allow a user to navigate through a space by modifying a search area in each view, or where the principle means for navigating is by employing a zooming feature in a user graphical interface. Other systems have been employed that provide a user simultaneous overlaying of both global and local views. Scaling techniques and transporting techniques have been developed to allow a user to move quickly to different locations in an environment. Typically, these systems require a user to work within or between two different unconstrained coordinate systems. Information visualization techniques are another mechanism for expanding the navigable space by distorting the views of the world. These techniques are sometimes disorienting and place additional cognitive load on the user to mentally re-map the spatial relations.

One particular technique referred to as "a point of interest technique" has proved relatively successful in providing a user with a mechanism to navigate easily through a 3D virtual world. The point of interest technique allows a user to focus on an object and to move toward that object automatically. System users can have arbitrary positions and orientations in each workspace and techniques are provided for rapidly controlled and targeted three dimensional movement by the user in the workspaces, such as the technique disclosed in U.S. Pat No. 5,276,785 to Mackinlay et al., entitled "Moving Viewpoint with Respect to a Target in a Three Dimensional Workspace." The viewpoint of the user (e.g., a virtual camera) can approach the point of interest (e.g., an object within the environment) asymptotically, with both radial and lateral motion. When the user requests viewpoint motion toward the point of interest, the system can provide animated motion so that the object constancy is preserved.

The problem with the point of interest technique and other information visualization techniques for navigating in a 3D environment is that the object must be in the user's field of view for the user to navigate to the object. Additionally, the user is presented with a predetermined forward face and vector normal to the face upon navigating to the object. A user may move around and inspect the object by simultaneously holding down both a forward and backward key. This has proven to be difficult and awkward for users when inspecting the object. Furthermore, the user is not able to navigate with a single motion of the input device.

Accordingly, there is an unmet need in the art for a system and method for providing improved navigation techniques to facilitate user interactions with a given visual metaphor in order to achieve a higher level of ease of use for a user navigating through a virtual world.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A system and method is provided for facilitating navigation techniques in a 3D virtual environment. The navigation technique employed considers the subtasks of exploration, search, inspection and object manipulation. The exploration subtask is employed to gain survey knowledge, the search subtask is employed to locate an object or route and to travel to it and the inspection subtask is to establish and maintain a particular view of an object. The manipulation subtask is employed to select and carry objects in the environment. The present invention provides techniques to navigate an animated camera through a 3D navigable workspace or environment, search and move to objects in the 3D environment and inspect and carry objects within the navigable workspace. The present invention employs a task-based taxonomy to determine travel control of the user with respect to viewpoint motion specified by position, orientation and speed of a virtual camera through a virtual environment. The present invention couples input driving techniques to the state of one or more workspace variables (e.g., object state, virtual body state, environment state) to change the user's viewing context within a single input control motion. Modification of the user's viewing context allows navigation to various positions and orientations without the need to be provided with that viewing context prior to navigation. Additionally, the change in the user's viewing context can occur over time upon deselection of the one or more workspace variables, so that the user is made aware of the change in position and orientation of the viewing context.

One aspect of the invention couples speed control to height position and tilt control of a virtual body or camera to give the user the ability to transition between and navigate within local and global views of a 3D world. In this technique, the user is equipped with standard egocentric driving controls, such as dragging a pointer forward/backward in order to move the camera forward/backward and dragging the mouse left/right to turn the camera left/right. The driving controls are coupled to the state of the virtual body or camera, so that the state of the virtual body or camera within the environment can be controlled. Additionally, the user's forward speed is coupled to the camera's viewing height and angle. The faster the user moves forward, the higher the camera moves providing a zoomed out view of the environment. The coupling of the speed to height and tilt keeps the visual flow across the screen constant in an effort to allow the user to move and locate distant targets quickly. As the user slows down or releases the button, the camera glides down forward to the ground and eventually lands at a point at the bottom of a viewing frustum. The technique also includes an object inspection technique or orbiting technique. The object inspection technique allows a user to select an object for inspection by selecting the object, for example, by holding down the button and dragging on the object with a pointer. The object is then moved to the center of the screen. The user can then orbit the object by dragging the pointer left/right and move to and from the object by dragging the pointer forward/backward.

In another aspect of the invention, an object manipulation technique allows users to specify objects in the environment toward which they would like to move. The technique is a function of object state position and orientation since the user is moved directly to the target destination. The object manipulation technique allows a user to drag on an object and manipulate a copy of the object placing it in a selected position and orientation. The copy fades away upon release of the button and the camera animates to a desired viewing context of the object. In another navigation technique, the user can drag and manipulate multiple copies of an object so as to get multiple simultaneous viewing contexts of the object and the environment. The copies are destroyed when the user moves away or selects another object to view. Another navigation technique allows the user to select an object to move to the exact position and orientation of the object thereby possessing it and seeing the world from the point of view of the object.

In yet another aspect of the invention, a navigation technique is employed that allows a user to manipulate the environment and object within the environment by controlling the radius of a circle or sphere centered on the user. Objects are either made transparent or scaled down, so as to reduce the amount of occlusion that objects within the radius present. The closer to the center of the sphere, the more transparent or smaller the objects are viewed. This allows users to scan through worlds very quickly by simply pivoting or turning and removing occlusions so as to see objects that are different distances away. A compression technique is provided that gives the user the ability to scale the state of the environment in a compressed single view. The entire world can be scaled down so the user gets an overview of the world. Alternatively, the user can compress the world radially around the camera so that all objects fit within the viewing context. The user can then navigate within the scaled down world or return the world to normal.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention is now described with reference to the drawings. The present invention is described with respect to a system and method for navigating through a three-dimensional (3D) environment by providing a user with continuous viewpoint control by coupling input device controls to a state of one or more workspace variables. The state of one or more workspace variables refers to the position, orientation, ephemeral state, size and other variables associated with a workspace variable. This allows a user to manipulate a state of a workspace variable (e.g., object state, environment state, virtual body state) from a first viewing context, and to employ that manipulated state to change the viewing context as experienced by the user. The viewing context can be defined as the field of view of the environment and objects within the environment as experienced by the user.

Figure 1:
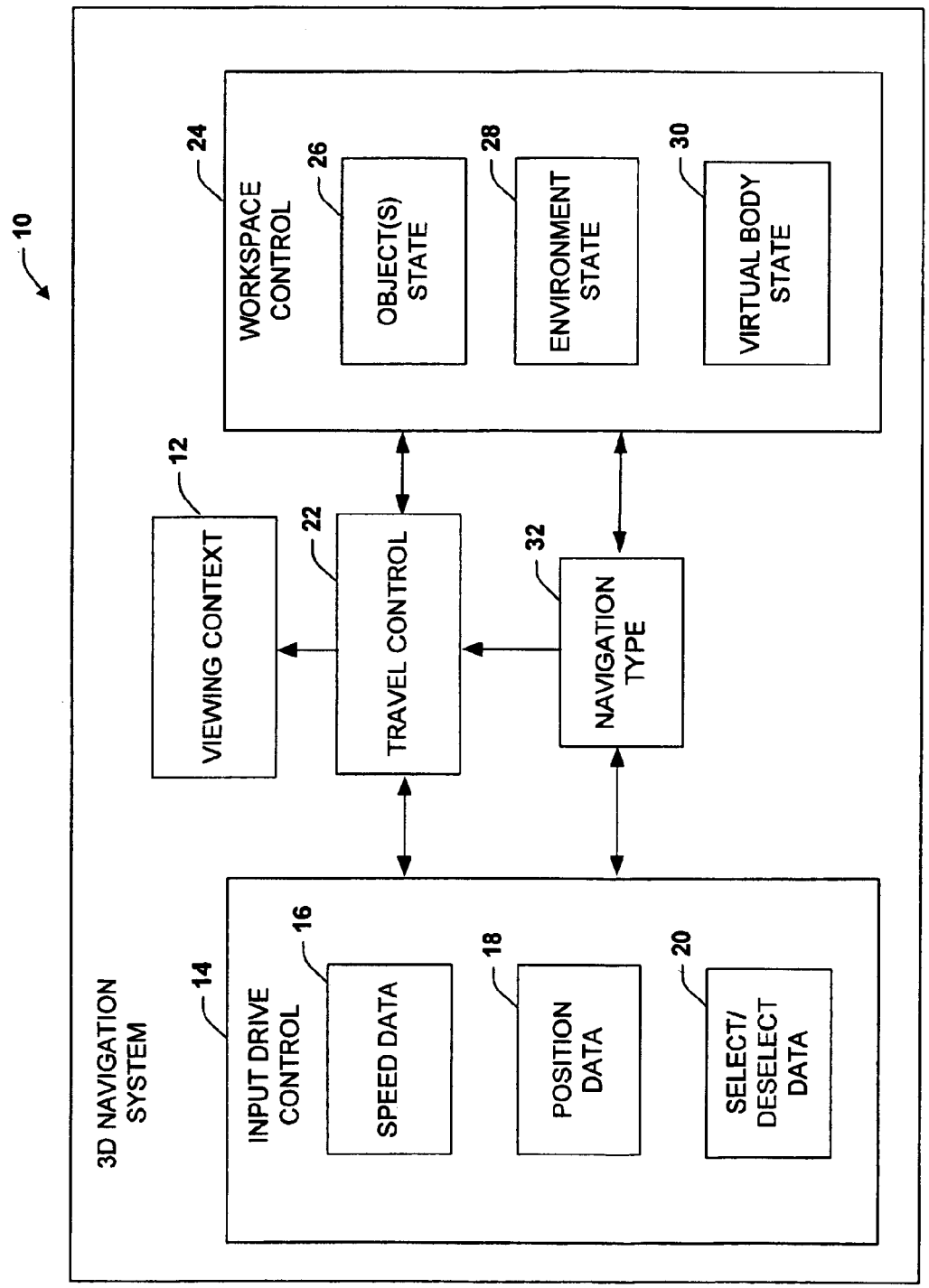
FIG. 1 illustrates a block diagram of a 3D navigation system in accordance with one aspect of the present invention.

FIG. 1 illustrates an example of a 3D navigation system 10 in accordance with an aspect of the present invention. The 3D navigation system 10 includes an input drive control system 14 with various input variables. The input variables include speed data 16, position data 18 and select/deselect data 20 with respect to movement and selections by an input device (e.g., a mouse pointer, joystick). The 3D navigation system 10 also includes a workspace control system 24 with various workspace variables. The workspace variables include object state(s) 26, environment state 28 and virtual body state 30. Each workspace variable can be manipulated and coupled to the input driving control system 14 through a travel control system 22. The travel control system 22 determines which workspace variables to couple to the input drive control system 14 employing a navigation type 32. The travel control system 22 determines an initial viewing context 12 that a virtual body or camera experiences based on the initial state of the virtual body 30, the 3D environment state 28 and object states 26 within the 3D environment. The travel control system 22 then couples the drive control system 14 to one or more workspace variables. The one or more workspace variables can then be manipulated and employed to change the viewing context 12 experienced by the user via the virtual body or camera and allow continuous viewpoint control.

The navigation type can be determined in a variety of manners. For example, functions keys on the keyboard can be provided to allow a user to select the navigation type. Alternatively, the user can be provided with a menu of navigation types by invoking a function key on a keyboard, right clicking on a computer mouse pointer or a selectable button on a joystick. Furthermore, menus or selections can be provided within the virtual environment and selected by the user via an input device. The navigation type can also be invoked automatically. For example, dragging within the environment can invoke one navigation type and dragging on an object can invoke another navigation type.

Figure 2:
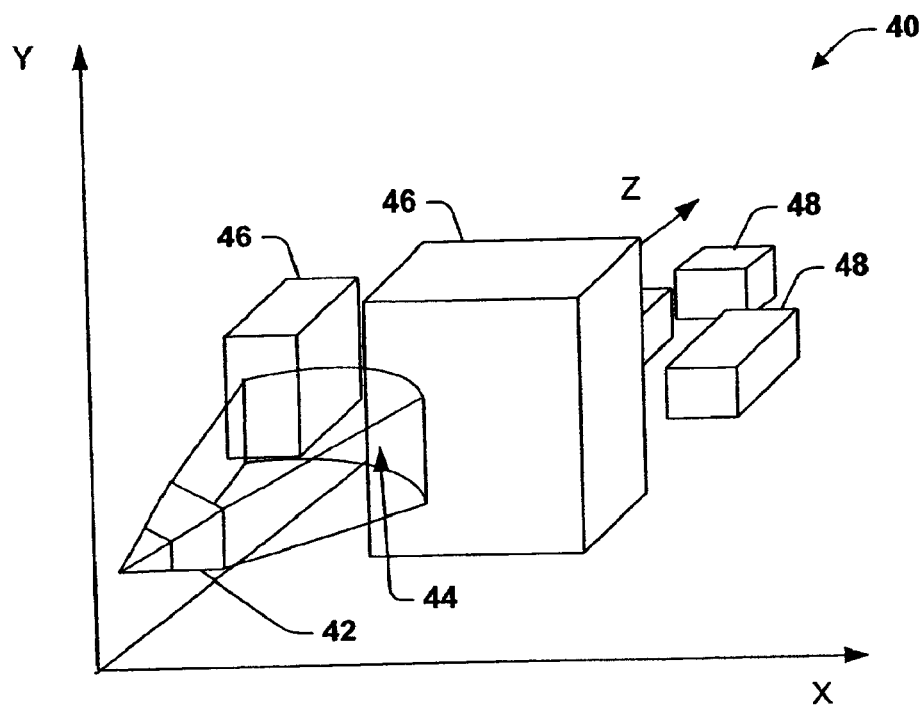
FIG. 2 illustrates a 3D schematic view of a virtual body having a local view of a 3D environment in accordance with one aspect of the invention.
Figure 3:
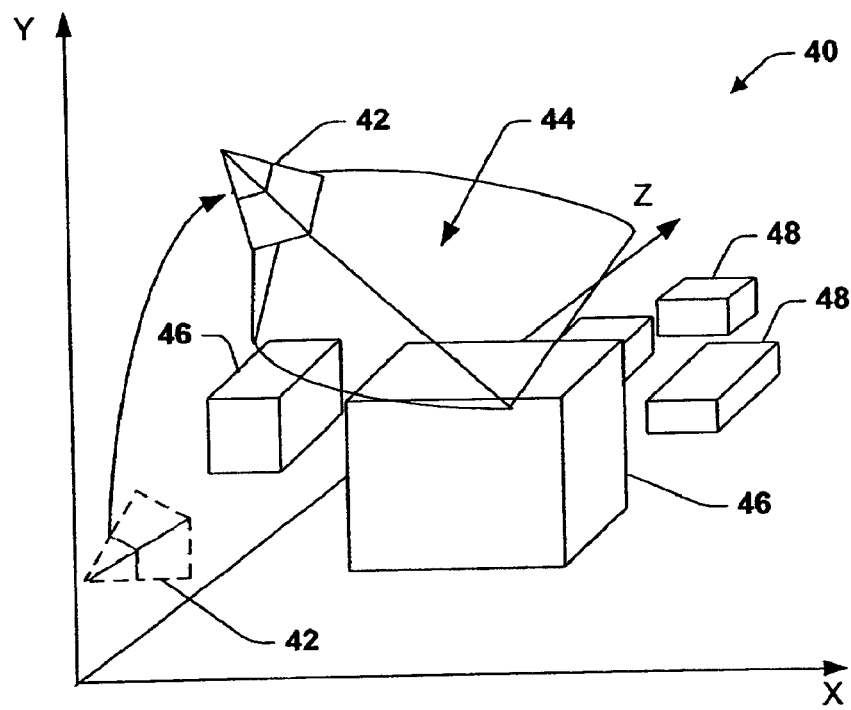
FIG. 3 illustrates a 3D schematic view of the virtual body having a global view of the 3D environment of FIG. 2 in accordance with one aspect of the invention.

FIGS. 2 and 3 illustrate a navigation technique (hereinafter referred to as "speed-coupled flying) in a 3D environment in accordance with one aspect of the invention. As illustrated in FIG. 2, a virtual camera or virtual body 42 has a viewing point specified by the position and orientation of the virtual body 42 into the 3D environment 40. The virtual body 42 has a viewing frustum 44 such that a viewing context includes objects 46 that are viewable horizontally within the viewing frustum 44. Other objects 48 reside in the 3D environment 40 but are not within the field of view of the virtual body 42. Speed-coupled flying includes coupling the input drive control system 14 to the virtual body state 30. In this particular technique, the state of the virtual body 42 is coupled to the input drive control system 14, such that the position and orientation of the virtual body 42 is varied based on changes in the input variables of the input drive control system 14. In speed coupled flying, the speed of which the input device is moved in a forward direction is coupled to the height or position of the virtual body 42 within the 3D environment 40 and the tilt or orientation of the virtual body 42. Speed-coupled flying gives the user the ability to transition seamlessly between and navigate within local as well as global views of the 3D environment 40.

The user can be provided with standard egocentric driving controls in the speed-coupled flying technique. The speed-coupled flying technique can be invoked using function keys on a keyboard, by employing a selectable menu or by invoking the select input 20 of the input device and dragging within the environment. Dragging the input device forward/backward moves the virtual body 42 forward/backward, while dragging the input device from the left/right turns the virtual body 42 left/right. Additionally, the user's speed is coupled to the viewing height and angle of the virtual body 42. The faster the input device is moved in the forward direction, the higher the virtual body 42 moves giving the user a zoomed out overview of the 3D environment 40. As illustrated in FIG. 3, the virtual body 42 rises above the objects 46 and 48 providing an overview of the 3D environment 40 and causing objects previously unviewable to fall within the viewing frustum 44 of the virtual body 42. As the state of the virtual body 42 changes, the viewing context 12 of the user is constantly updated, so that the user appears to be in motion. Coupling speed to height and tilt keeps the visual flow across the screen constant allowing the user to move and locate distant targets quickly. The user can employ the input device in steering the virtual body over the environment by moving the input device left/right while moving in the forward direction.

As described above, the faster a user moves the input device the faster the viewing context 12 within the viewing domain moves, the higher the position of the virtual body 42 within the 3D environment 40 and the steeper angle of the viewing frustum 44 of the virtual body 42. However, it is to be appreciated that in some circumstances, if the virtual body 42 is moved too high objects within the viewing frustum 44 will appear too small to be discernible. Therefore, in one aspect of the invention a height limit is selected based on the viewing environment size and the size of the objects in comparison to the viewing environment.

Figure 4:
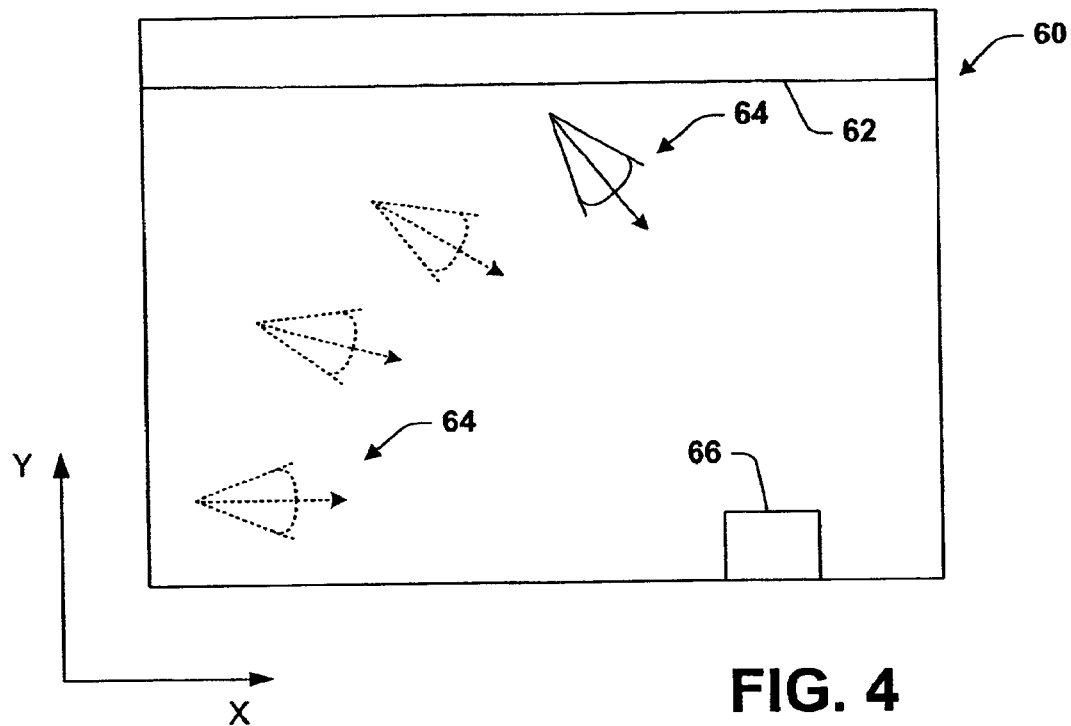
FIG. 4 illustrates a side view of the virtual body navigating through a 3D environment in accordance with one aspect of the invention.

FIG. 4 illustrates a 3D environment 60 with a virtual body 64 and an object 66. The 3D environment is illustrated within two dimensions for the purpose of simplicity. The virtual body 64 begins with a viewing context with respect to a ground surface or plane of the 3D environment. As the height of the virtual body 64 is increased and the tilt of the virtual body increases, different viewing contexts of the object 66 and the 3D environment are provided to the user.

Eventually, the height of the virtual body 64 is limited by a ceiling 62. The ceiling 62 is determined based on the size of the 3D environment 60 and the size of the object 66 with respect to the size of the environment. The user can then control the height of the virtual body by speeding up or slowing down the virtual body. As the user slows down or releases a selection button corresponding to the select/deselect input variable, the virtual body 64 glides back down to the ground or the level it was before flying. The change in the viewing context of the virtual body as it glides down takes place over time, so that the user is made aware of the change in position and orientation of the viewing context. The speed coupled flying technique allows the user to adjust the user's viewing context and navigate to another location in the 3D environment in a single input motion using the same drive controls.

Figure 5:
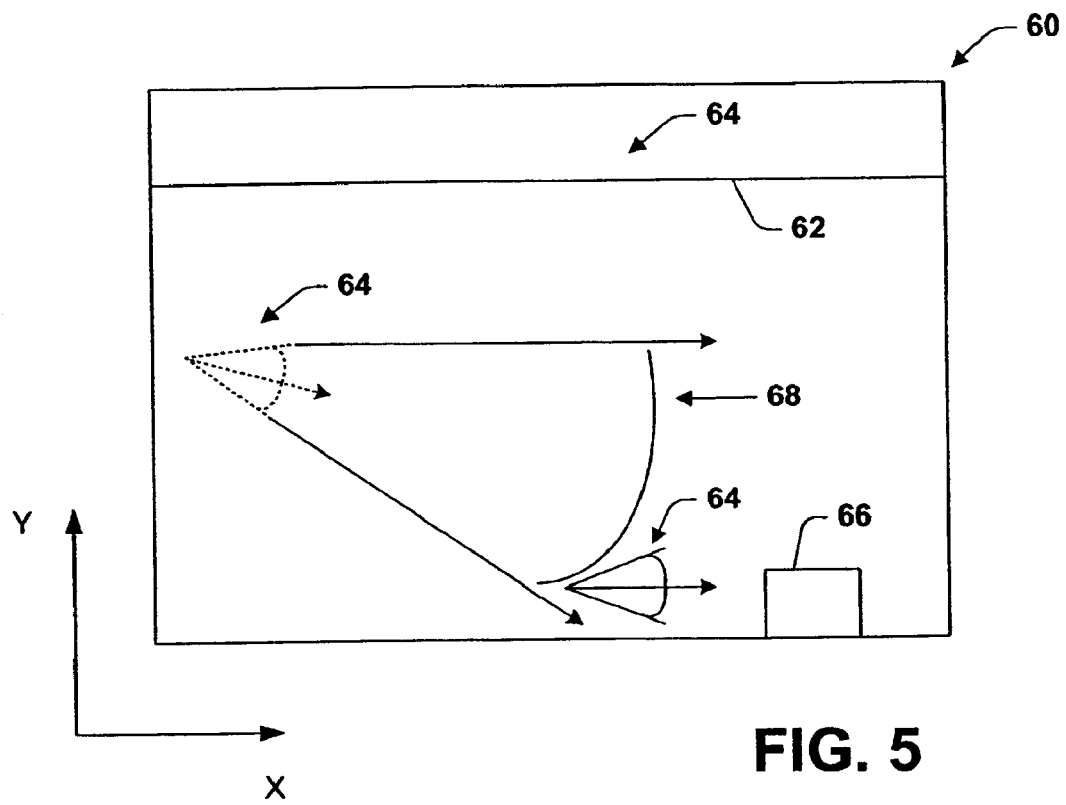
FIG. 5 illustrates a side view of the virtual body gliding down to a ground plane of the 3D environment of FIG. 4 in accordance with one aspect of the invention.

The virtual body eventually lands at a point in the 3D environment 60 at the bottom of a viewing frustum when the deselection is made. As illustrated in FIG. 5, the virtual body 64 glides down to the bottom of a viewing frustum 68 in front of the object 66. Alternatively, the virtual body 64 may glide down to an object or thing that the user was viewing as opposed to the bottom of the viewing frustum 68. The user can then employ object inspection techniques to inspect the object 66.

Figure 6:
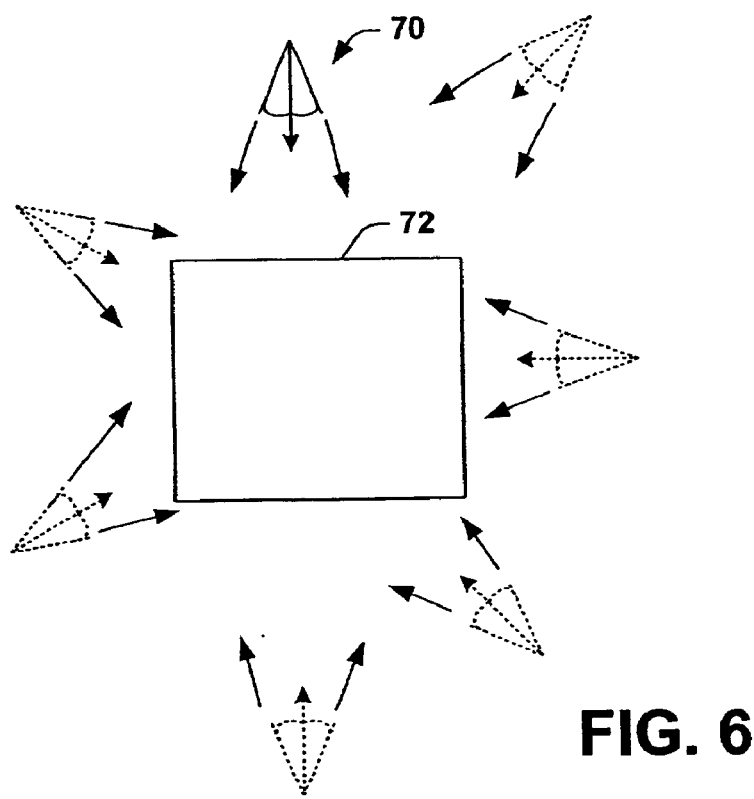
FIG. 6 illustrates a top plan view of a virtual body orbiting around an object in accordance with one aspect of the invention.

FIG. 6 illustrates an object inspection technique referred to as orbiting. Orbiting allows a user to easily get desired viewpoints of particular target objects. When the user clicks and drags on an object, the object animates to the center of the screen and the user is switched to a mode of environmental state navigation. In this mode, dragging the input device forward/backward moves the virtual body toward/away from the object, while dragging the input device left/right causes the user to move around a circle parallel to the ground plane and centered at the object, always keeping the viewpoint fixed on that object. FIG. 6 illustrates a top view of a virtual body 70 as it orbits around an object 72. As can be seen from the figure, the virtual body can move toward and away from the object 72 in addition to orbiting around the object in the same continuous motion. The orbiting technique couples the input driving controls to the state of the virtual body 30 and the select/deselect input to the state of the object. Once the user deselects the object 72, the new position and orientation of the virtual body 70 is retained. The change in the viewing context of the virtual body can take place over time, so that the user is made aware in the change in position and orientation of the viewing context. In an alternate aspect of the invention, the virtual body 70 can move back to its original position and orientation before selecting the object 72. The user can navigate around the object in a single input motion using the same drive controls.

Figure 7:
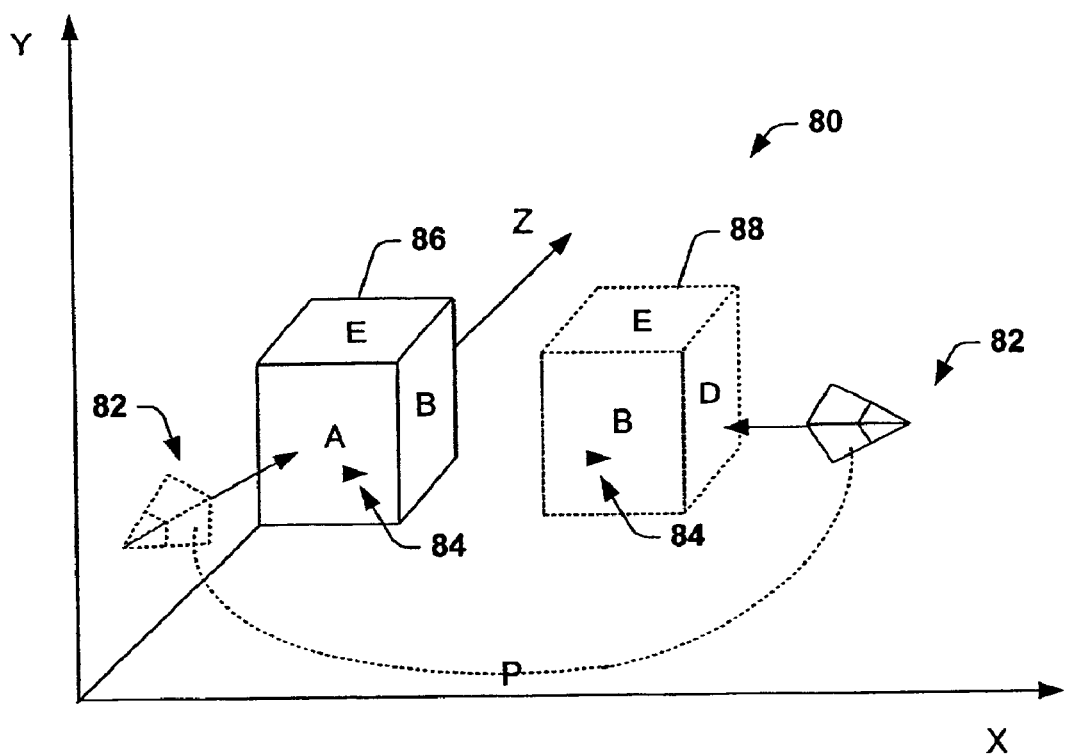
FIG. 7 illustrates a 3D schematic view of a virtual body navigating by object manipulation in accordance with one aspect of the invention.
Figure 8:
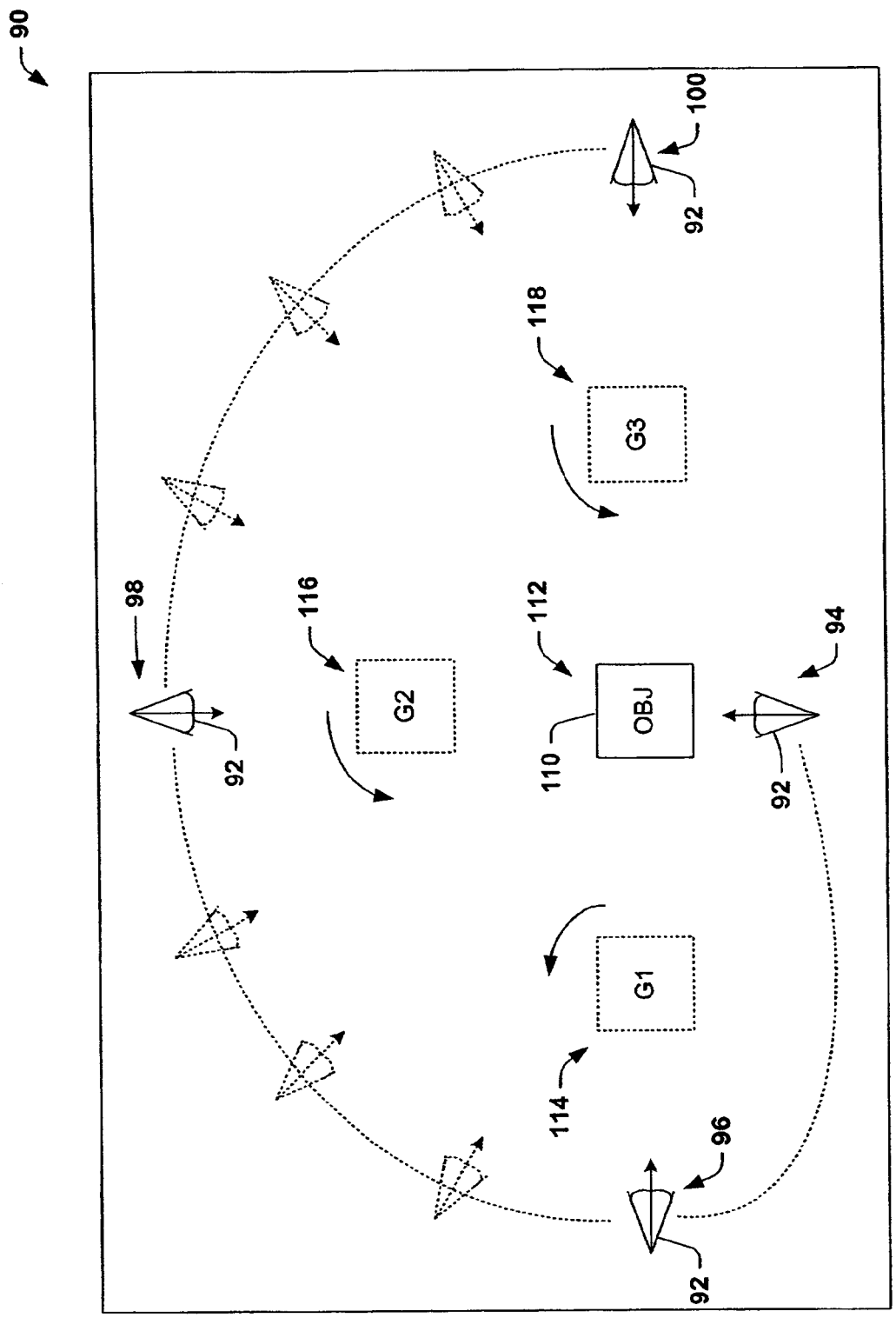
FIG. 8 illustrates a top plan view of a virtual body navigating by object manipulation in accordance with one aspect of the invention.

FIGS. 7–8 illustrate another navigation technique (hereinafter referred to as "the object manipulation technique") in accordance with the present invention. In the object manipulation technique, the user selects and drags on an object and manipulates a copy of the object, placing it in a position and an orientation, which the user would like to view the object. When the object is deselected, the copy fades away and the virtual body animates to the appropriate position and orientation in the 3D environment to attain the desired viewpoint of the object. The object manipulation technique couples the input drive controls 14 to the object state 26 once the object is selected.

As illustrated in FIG. 7, a virtual camera or virtual body 82 has a viewing point specified by the position and orientation of the virtual body 82 into a 3D environment 80. The initial viewing context is into the 3D environment 80 along a Z-axis. A user may select an object 86 by placing a cursor 84 over the object 86 employing an input device (e.g., a computer mouse). The user can then drag the object 86 into the 3D environment 80 creating a ghost copy 88 of the object 86. The ghost copy 88 can then be manipulated with respect to orientation and position of the object within the 3D environment 80. Once the object is deselected, the virtual body 82 moves to a new position and orientation in the 3D environment 80. The virtual body 82 moves to a new viewing location based on the position and orientation of the ghost copy 88 with respect to the object 86. The virtual body movement takes place as an animation over time (e.g., 1 second) along a path P, so that the user is made aware of the change of position and orientation of the virtual body 82. In the example of FIG. 7, the viewing context is modified into the 3D environment 80 axially along an X-axis. It is to be appreciated that the viewing context can be modified along any or all of the X, Y and Z-axes.

FIG. 8 is a top view of a 3D navigation environment 90 illustrating navigation within the 3D environment by manipulation of a copy of an object 110. A virtual body or camera 92 is located in a first virtual body position and orientation 94 with a viewing context of the object 110 in a first position and orientation 112. The object 110 is then selected and dragged on creating a ghost copy (G1). The ghost copy G1 is rotated counterclockwise and moved to a second object position and orientation 114. Upon deselection of the object 110, the virtual body 92 is moved along a path to a second virtual body position and orientation 96 based on the second object position and orientation 114 with respect to the orientation and position 112 of the original object 110. The object 110 is then selected and dragged on creating a ghost copy (G2), which is then rotated counterclockwise and moved to a third object position and orientation 116. Upon deselection of the object 110, the virtual body 92 is moved along a path to a third virtual body position and orientation 98 based on the third object position and orientation 116 with respect to the orientation and position 112 of the original object 110. The object 110 is then selected and dragged on creating a ghost copy (G3), which is then rotated counterclockwise and moved to a fourth object position and orientation 118. Upon deselection of the object 110, the virtual body 92 is moved along a path to a fourth virtual body position and orientation 100 based on the fourth object position and orientation 118 with respect to the orientation and position 112 of the original object 110. During each movement of the state of the object 110, the virtual body 92 is moved to a new position and orientation providing the virtual body 92 with a different viewing context upon each move. Each move can be accomplished in a single input motion using the same drive control.

Figure 9:
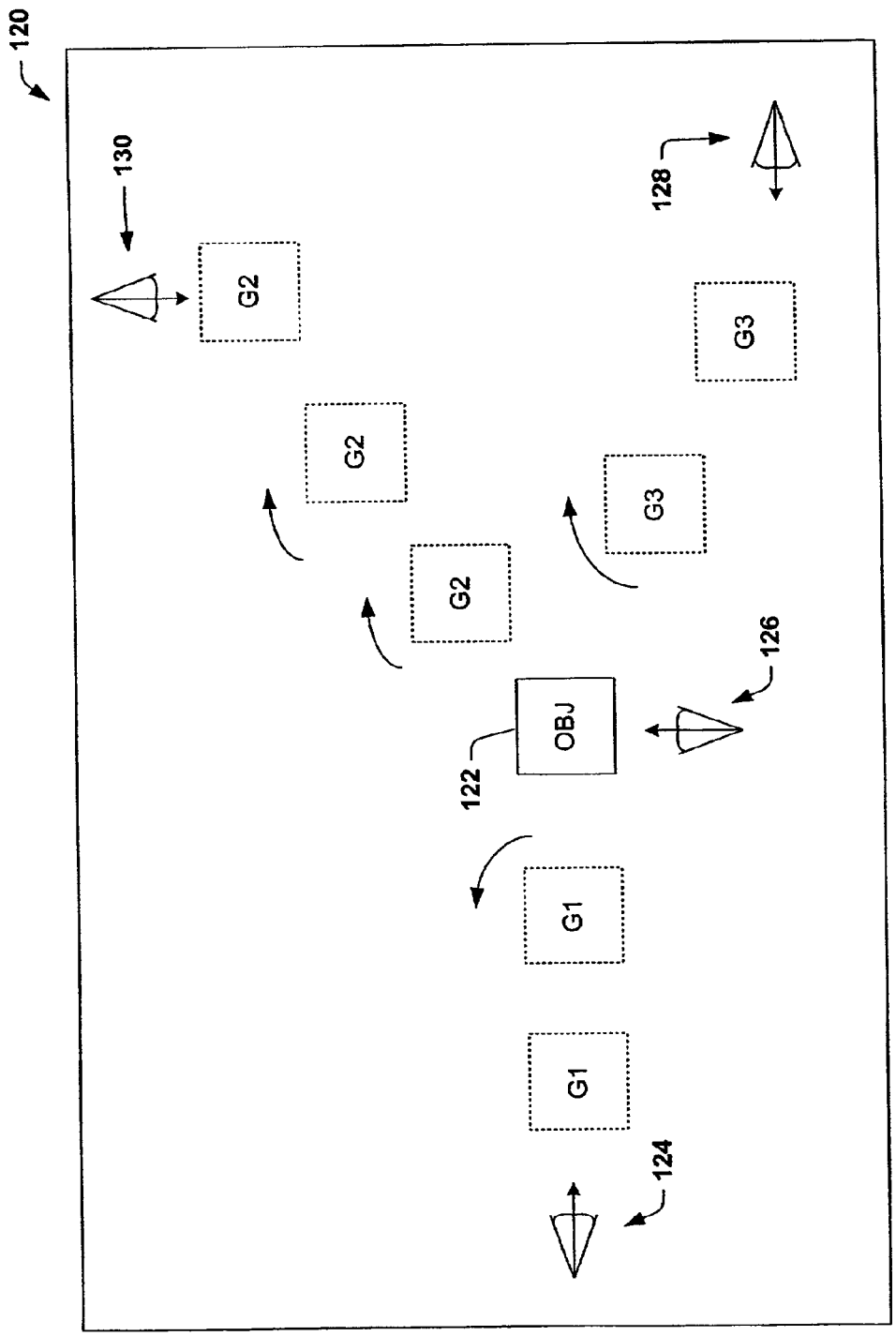
FIG. 9 illustrates a top plan view of a virtual body navigating by creating multiple viewing contexts in accordance with one aspect of the invention.

FIG. 9 illustrates an alternate navigation technique (hereinafter referred to as the "the ghost copy technique"). In the ghost copy technique, the user drags and manipulates multiple copies of an object so as to get multiple simultaneous viewpoints of the object and the environment surrounding the object. The user can then be provided with multiple viewing contexts from which to view the object and the environment. Once the user deselects the object or selects another object, the copies are destroyed. FIG. 9 is a top view of a 3D navigation environment 120 illustrating navigation within the 3D environment by the ghost copy technique. A virtual body or camera 126 is located in the 3D environment 120 with a viewing context including a view of an object 122 in a first object position and orientation. The object 122 is then selected and dragged on creating a ghost copy (G1), which is then rotated counterclockwise and moved to a second object position and orientation, which creates a second virtual body or camera 124 with a different viewing context than the first virtual body 126. The object is then dragged in a diagonal direction creating a ghost copy (G2) which is rotated clockwise twice to a third object position and orientation creating a third virtual body 130 with another viewing context different from the first and second virtual bodies 126 and 124, respectively. The object 122 is then dragged in a diagonal direction creating a ghost copy (G3) which is rotated clockwise to a fourth object position and orientation creating a fourth virtual body 128 with another viewing context different from any of the other virtual bodies. During creation and manipulation of the ghost copies and the creating of other virtual bodies and viewing contexts, the object 122 remains in its original position and orientation. Once the object 122 is deselected, the ghost copies are destroyed. Each ghost copy and each viewing context can be provided by a single input motion using the same drive controls.

Figure 10:
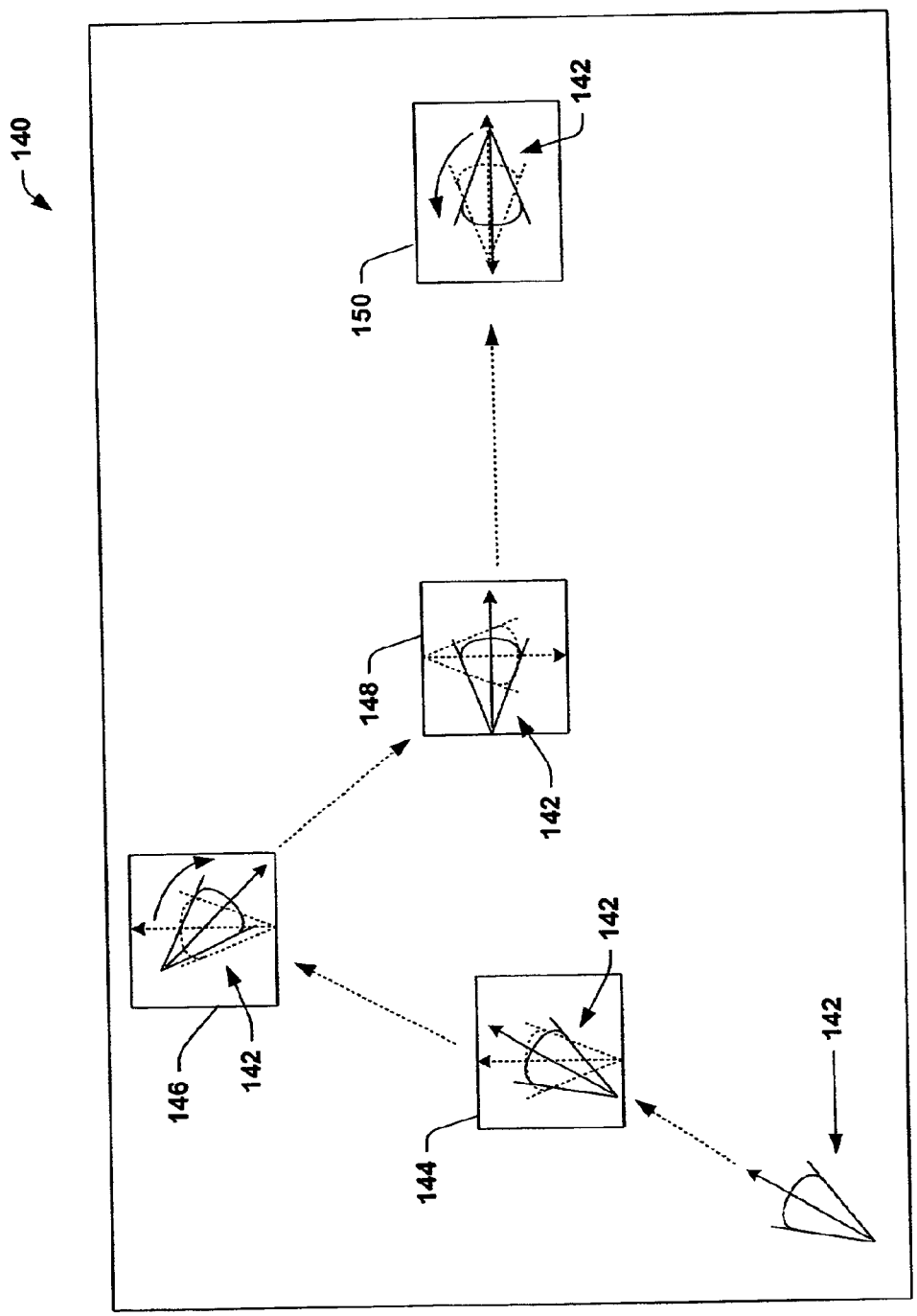
FIG. 10 illustrates a top plan view of a virtual body navigating by object possession in accordance with one aspect of the invention.

FIG. 10 illustrates another navigation technique (hereinafter referred to as the "the possession navigation technique"). It is appreciated that existing techniques do not allow the user to see the 3D world from the point of view of another actor or object. In the possession technique, the user selects an object to move to the exact position and orientation of that object, thereby possessing the object and viewing the 3D environment from the point of view of the object. The virtual body state takes on the state of the object that it possesses. The viewing context can take on the main pivot point of the object looking forward for objects that rotate.

FIG. 10 is a top view of a 3D navigation environment 140 illustrating navigation within the 3D environment by the possession technique. A virtual body or camera 142 is located in the 3D environment 140 in a first virtual body position and orientation with a viewing context including a view of an object 144 in a first object position and orientation. The user then selects the object 144 in its first position and orientation and possesses the object 144 inheriting the objects position and orientation. The virtual body 142 then is provided with a viewing context from the point of view of the object 144. The virtual body 142 then selects a second object 146 and possesses the second object, which automatically abandons the viewing context from the point of view of the object 144. Once the object is possessed the virtual body 142 within the object can be rotated for locating additional objects. The virtual body 142 then selects and possesses a third object 148 providing the virtual body 142 with a viewing context from the third object 148, which automatically abandons the viewing context from the point of view of the object 146. The virtual body 142 then selects and possesses a fourth object 150 providing the virtual body 142 with a viewing context from the fourth object, which automatically abandons the viewing context from the point of view of the object 148. The virtual body 142 can be moved around through the environment 140 by selecting and possessing various objects. It is to be appreciated that the possession navigation technique can be integrated into the object manipulation technique, such that the user can move objects and possess those objects within the 3D environment changing the viewing context as experienced by the user. Each move and change in viewing context can be accomplished in a single input motion using the same drive control. Additionally, the change in the viewing context can take place over time, so that the user is made aware of the change in position and orientation of the viewing context.

Figure 11:
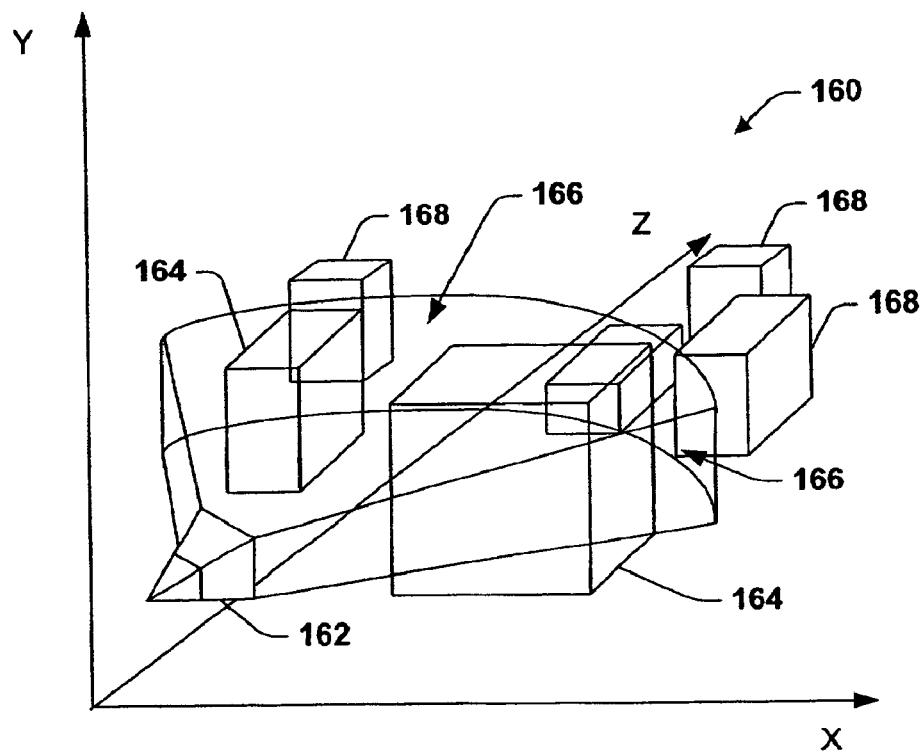
FIG. 11 illustrates a 3D schematic view of a virtual body manipulating a viewing context by making objects transparent within a radius centered on the virtual body in accordance with one aspect of the invention.

FIG. 11 illustrates a navigation technique (hereinafter referred to as "the inverse fog technique") in a 3D environment 160 in accordance with one aspect of the invention. As illustrated in FIG. 11, a virtual camera or virtual body 162 has a viewing point specified by the position and orientation of the virtual body 162 into the 3D environment 160. The user controls a radius 166 of a circle or sphere centered on the virtual body 162. Objects 164 that fall within the radius 166 are made transparent such that objects 168 outside the radius 166 are viewable within the viewing context of the user. The inverse fog technique couples the input drive controls to the object states such that the object states can be changed by moving the virtual body 162 through the 3D environment 160 and transforming the objects within the radius 166 to a state of transparency. Alternatively, the virtual body 162 can be stationary and the radius 166 controllable by the input driving device. It is to be appreciated that the function of movement of the virtual body 162 and the radius 166 can be combined in a variety of manners.

Figure 12:
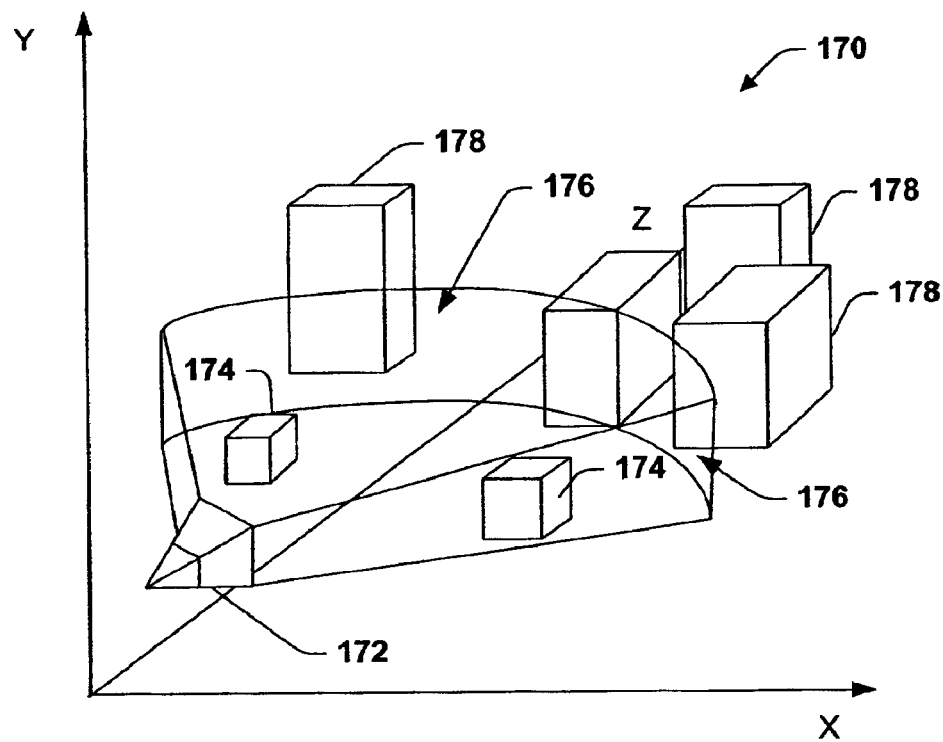
FIG. 12 illustrates a 3D schematic view of a virtual body manipulating a viewing context by making objects smaller within a radius centered on the virtual body in accordance with one aspect of the invention.

FIG. 12 illustrates a navigation technique (hereinafter referred to as "the inverse scaling technique") in a 3D environment 170 in accordance with one aspect of the invention. As illustrated in FIG. 12, a virtual camera or virtual body 172 has a viewing point specified by the position and orientation of the virtual body 172 into the 3D environment 170. The user controls a radius 176 of a circle or sphere centered on the virtual body 172. Objects 174 that fall within the sphere are scaled down or made smaller and objects outside the radius are scaled up or made larger, such that objects 178 outside the radius 176 are viewable within the viewing context of the user. The scale factor is based on the distance between the virtual body 172 and each object. This allows objects that are far away to be enlarged enough to fall within the viewing context. The inverse scaling technique couples the input drive controls to the state of the objects, such that the object state can be changed to a reduced size by moving the virtual body 172 through the 3D environment 170 and thus the radius 176 transforms the objects within the radius to a reduced size state. Alternatively, the virtual body 172 can be stationary and the radius 176 controllable by the input driving device.

Figure 13:
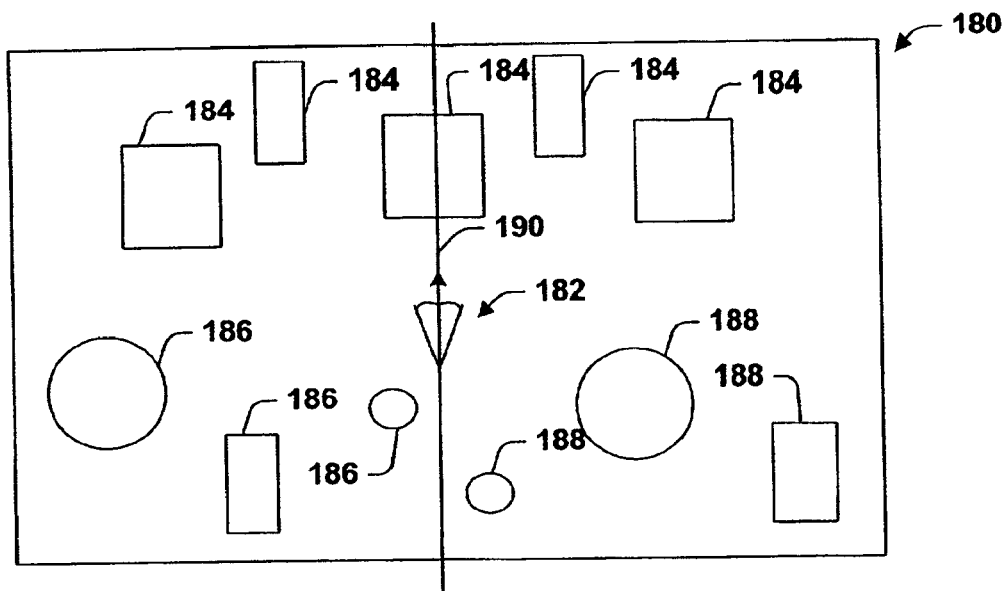
FIG. 13 illustrates a top plan view of a virtual body within a 3D environment in accordance with one aspect of the invention.
Figure 14:
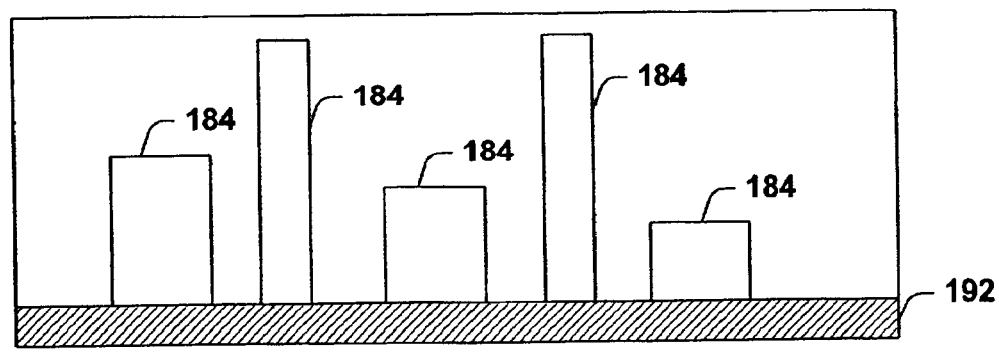
FIG. 14 illustrates a front view of a viewing context of the virtual body within the 3D environment of FIG. 13 in accordance with one aspect of the invention.
Figure 15:
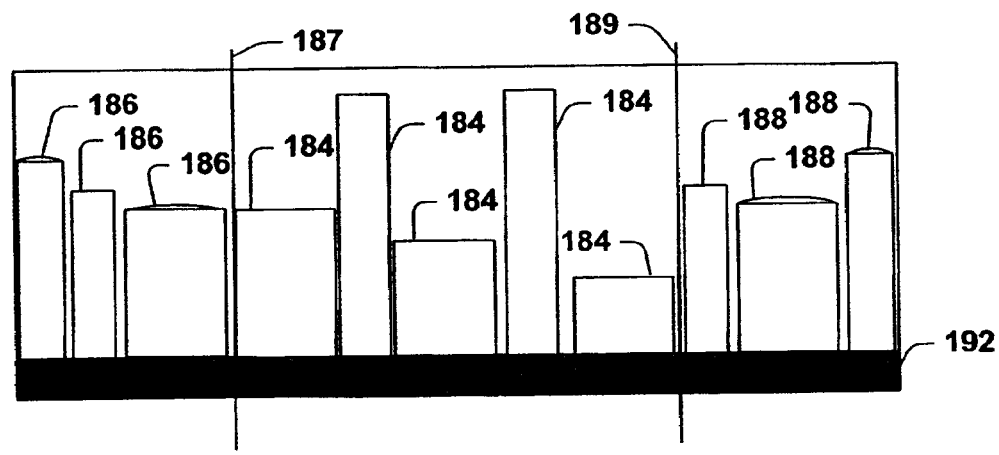
FIG. 15 illustrates a front view of an adjusted viewing context of the virtual body within the 3D environment of FIG. 13 after the 3D environment is compressed in accordance with one aspect of the invention.

FIGS. 13–15 illustrate yet another navigation technique (hereinafter referred to as "ephemeral world compression") in which the environment state is coupled to the input drive controls, such that the user can compress the 3D environment and view objects that reside behind the user's original field of view. FIG. 13 illustrates a top view of a 3D environment 180 in which a virtual body or camera 182 resides in the 3D environment 180. A number of objects 184 reside in the 3D environment 180 that are viewable by the virtual body 182 within the current viewing context. A number of objects are behind the virtual body 182 such that the objects are not within the field of view or viewing context of the virtual body 182. The virtual body 182 includes a number of objects 186 that are to the left of a central axis 190 of the virtual body 182 and behind the virtual body 182. The virtual body 182 also includes a number of objects 188 that are to the right of the central axis 190 and behind the virtual body 182. FIG. 14 illustrates the viewing context as experience by the user through the virtual body 182. The objects 184 and a ground plane 192 are within the viewing context of the virtual body 182.

In ephemeral world compression, the user is given the ability to compress the world down to facilitate an understanding of the structures of the 3D environment or facilitating the search for objects. The user can compress the 3D world radially around the viewing body, so that all the objects fit within the viewing frustum. The user can then navigate within the compressed environment and return the world to normal when the user is in a desired location within the 3D environment. FIG. 15 illustrates a viewing context in which the 3D world is radially compressed into a single view by coupling the input driving control to the environment state. The viewing context includes objects that previously were not viewable by the virtual body 182. A first separation bar 187 is provided to illustrate the previously viewable objects 184 and the objects 186 that were previously unviewable because they were located to the left of the central axis 190 behind the virtual body 182. A second separation bar 189 is provided to illustrate the previously viewable objects 184 and the objects 188 that were previously unviewable because they were located to the right of the central axis 190 behind the virtual body 182. Additionally, the ground plane 192 is compressed to provide a more realistic environment. The user can then navigate the virtual body 182 through the compressed environment until the user reaches a desired location. The user can then deselect the compression technique returning the 3D environment 180 to normal. Compression of the 3D world and movement through the compressed 3D world can be accomplished in a single input motion using the same drive control. Additionally, the compression and decompression of the 3D world can take place over time, so that the user is made aware of the change in position and orientation of the viewing context.

Figure 16:
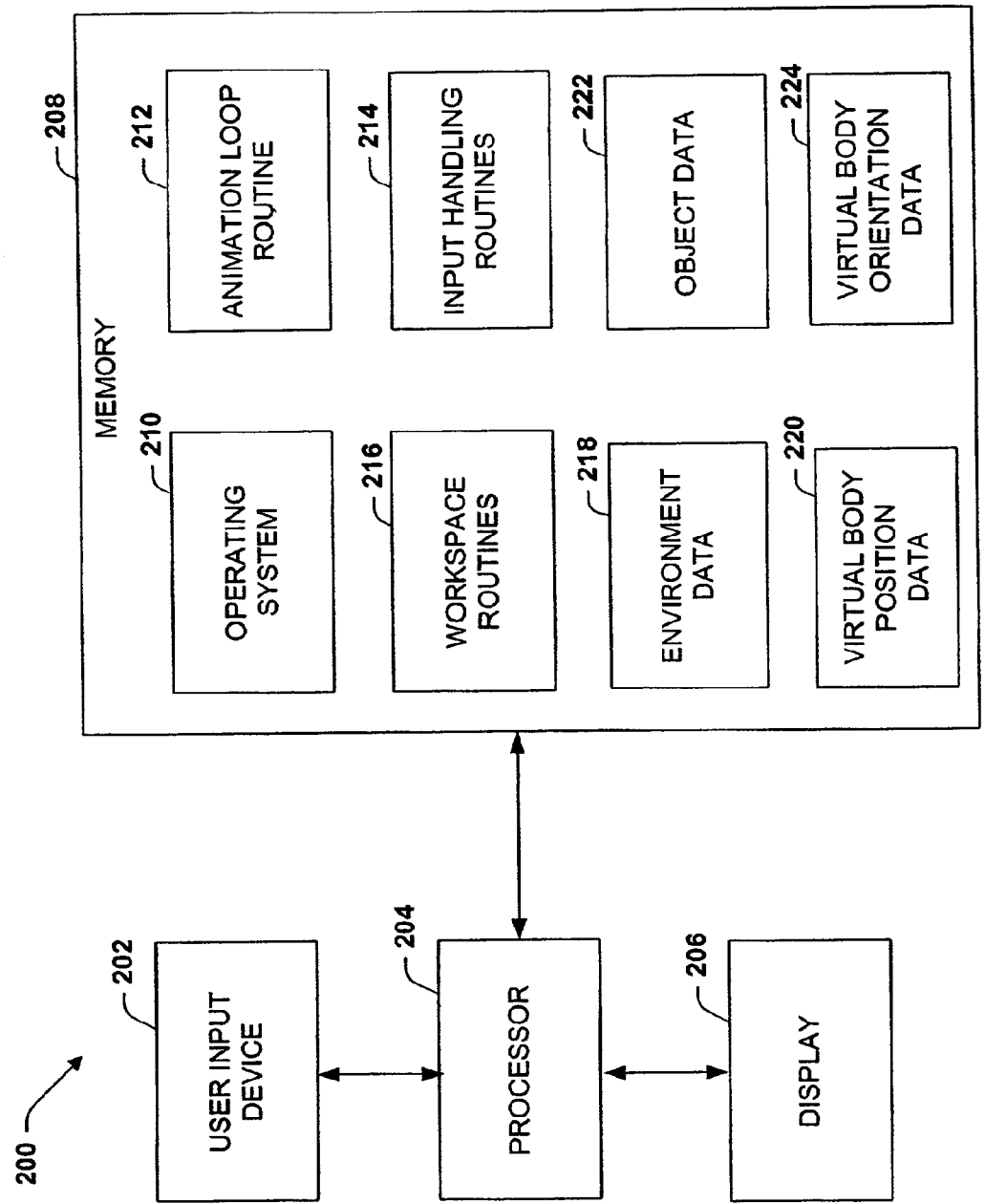
FIG. 16 illustrates a block diagram of a processor driven 3D navigation system in accordance with one aspect of the invention.

FIG. 16 illustrates a block diagram of a system 200 implementing the invention in accordance with an aspect of the invention. The system 200 includes a processor 204 coupled to a user input device 202 and a display 206. The user input device 202 provides input drive signals to the processor 204 for controlling the state of various workspace variables. The user input device 202 can be a computer mouse and/or keyboard or a joystick coupled to the processor 204. During execution of instructions, the processor 204 may access memory 208 in addition to receiving signals from the input device 202 and presenting images on the display 206. The memory 208 includes an operating system 210 that provides an environment from which a user may invoke an animation loop routine 212. The memory 208 includes input handling routines 214 for handling actions by a user with respect to the user input device 202 and storing event information for execution based on these actions.

In response to invocation of the 3D navigation system, the processor 202 executes the animation loop routine 212 which is an animation loop that continues until it is terminated by an appropriate signal by the user input device 202. Each animation loop cycle calls the input handling routines 214 to receive and handle the next item on an event queue maintained by the operating system 210. The event queue includes actions by the user corresponding to the user input device 202, such as keystrokes, selection events, mouse events, mouse pointer movement and events from other sources. Each animation cycle also includes a call to a set of workspace routines 216 to determine the current navigation type, the current state of the virtual body, the environment and objects within the environment. The workspace routines employ workspace data structures to determine and adjust the state of the various variables within the workspace. A virtual body position data structure 220 is provided to determine and adjust the position of the virtual body within the 3D environment, and a virtual body orientation data structure 224 is provided to determine and adjust the orientation of the virtual body within the 3D environment. The memory 208 also includes a set of object data structures 222 that allow the workspace routines to determine and adjust the state of any selected objects within the 3D environment. For example, each object data structure can provide a description that includes position, orientation, size, shape, transparency and other states about the object within the 3D environment of which the object gets rendered. Finally, the memory 208 includes environment data structures 218 that allow the state of the environment to be determined and adjusted in accordance with one or more navigation types.

Figure 17:
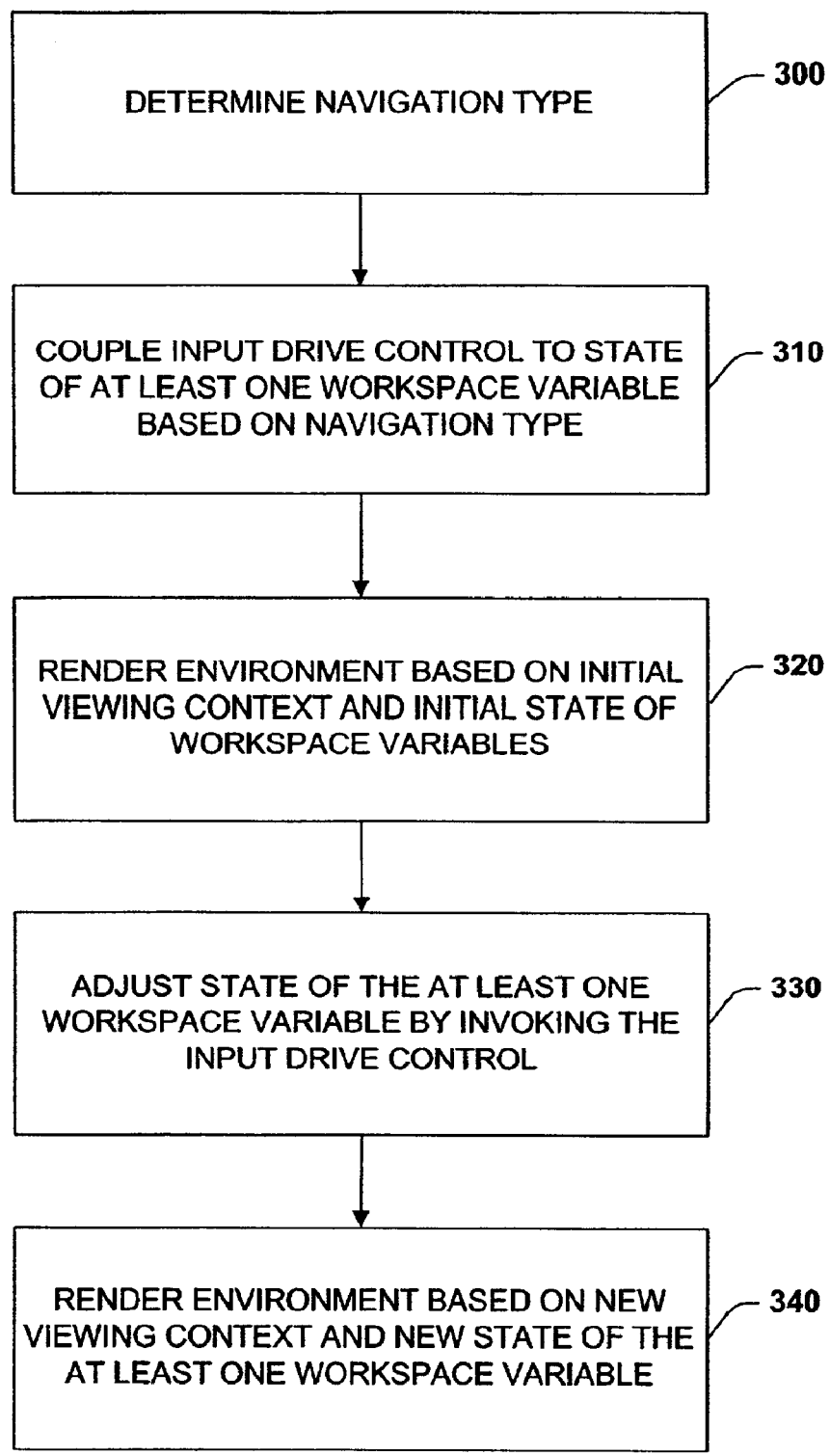
FIG. 17 illustrates a flow diagram of a methodology for navigating through a 3D environment in accordance with one aspect of the present invention.

In view of the foregoing structural and functional features described above, a methodology in accordance with various aspects of the present invention will be better appreciated with reference to FIG. 17. While, for purposes of simplicity of explanation, the methodology of FIG. 17 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 17 illustrates one particular methodology for providing navigation within a 3D environment in accordance with the present invention. The methodology begins at 300 where a navigation type is determined. The navigation type can be determined in a variety of manners. For example, function keys on the keyboard can be provided to allow a user to select the navigation type, or the user can be provided with a menu of navigation types by invoking a function key on a keyboard, right clicking on a computer mouse pointer or a selectable button on a joystick. The navigation type can also be invoked automatically or be preset prior to invocation of the 3D environment. For example, dragging within the environment can invoke one navigation type and dragging on an object can invoke another navigation type. At 310, the input drive controls are coupled to the state of at least one workspace variable based on the navigation type. The 3D environment is then rendered through an animation loop or the like based on the initial viewing context and the initial state of the workspace variables at 320. The methodology then proceeds to 330 where the state of the at least one workspace variables is adjusted through invocation of the input drive control device. At 340, the environment is again rendered based on the new viewing context and new state of the at least one workspace variable.

Figure 18:
FIG. 18 illustrates a local view of a 3D amusement park in an Alice environment in accordance with one aspect of the present invention.
Figure 19:
FIG. 19 illustrates a global view of the 3D amusement park in the Alice environment using the speed-coupled flying technique in accordance with one aspect of the present invention.
Figure 20:
FIG. 20 illustrates a local view of the 3D amusement park in the Alice environment after gliding down to a ground plane in front of an object using the speed-coupled flying technique in accordance with one aspect of the present invention.

The present invention can be practiced in the context of a 3D interactive graphics programming environment, such as Alice. Alice was built for Windows 95/98/NT by the Stage 3 Research Group at Carnegie Mellon University. Worlds created in Alice can be viewed and interacted with inside of a standard web browser or the like. Alice is primarily a scripting and prototyping environment for 3D object behavior. Scripts can control object appearance and behavior, and while the scripts are executing, objects respond to user input via a mouse and keyboard. FIGS. 18–21 illustrate a 3D amusement park environment designed utilizing Alice tools. FIG. 18 illustrates a first viewing context 370 of a virtual camera or the like when a user views the 3D environment along a ground plane. FIG. 19 illustrates a second viewing context 380 when the user invokes the speed-coupled flying technique and is provided with a global view of the 3D environment. FIG. 20 illustrates a third viewing context 390 after the user has glided down to a ground plane in front of an object after navigating through the environment by the speed-coupled flying technique.

Figure 21:
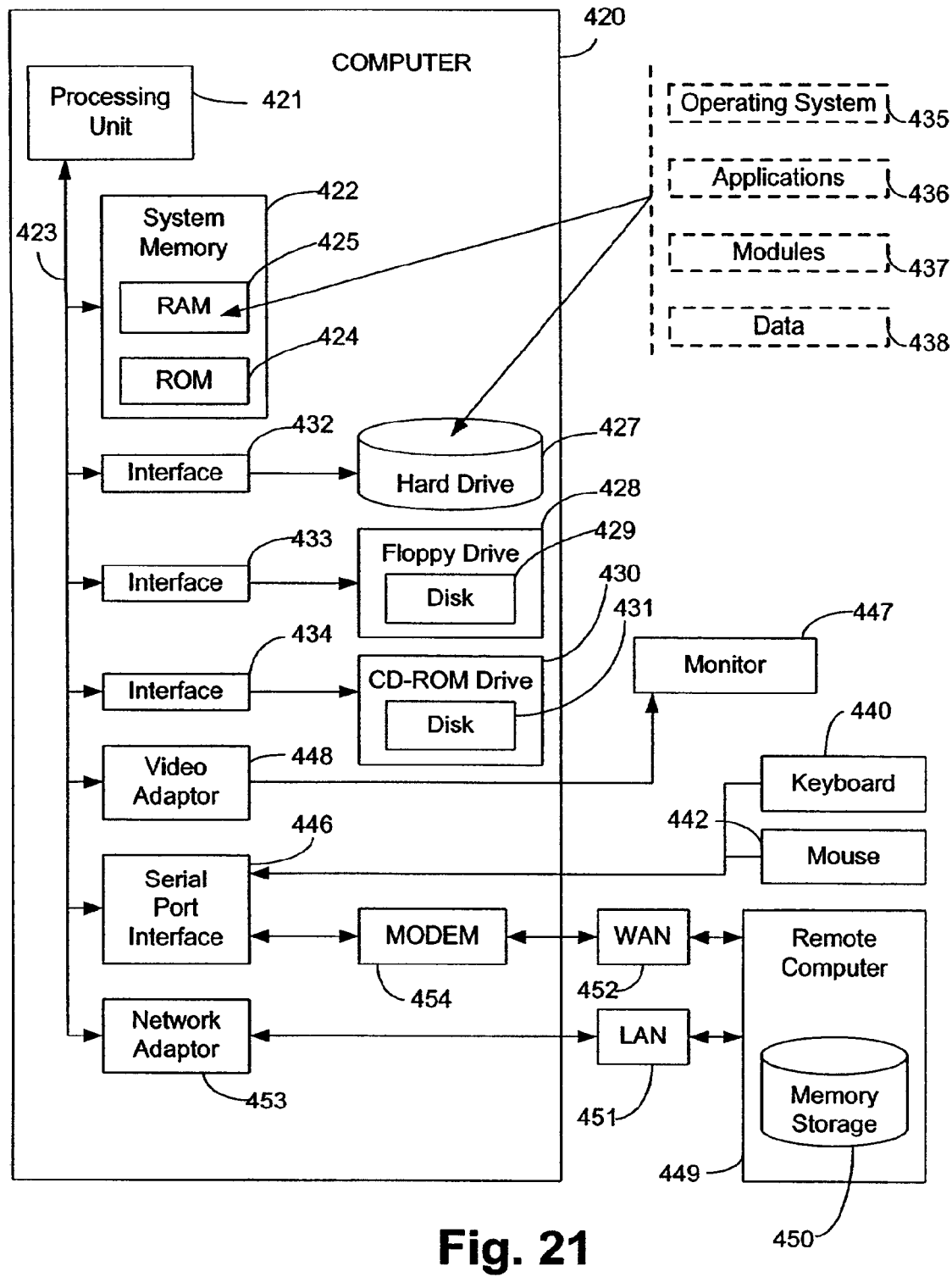
FIG. 21 illustrates a block diagram of a computer system in accordance with an environment of the present invention.

With reference to FIG. 21, an exemplary system for implementing the invention includes a conventional personal or server computer 420, including a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438. A user may enter commands and information into the computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote server or client computer 449. The remote computer 449 may be a workstation, a server computer, a router, a peer device or other common network node, and typically includes many or all of the elements described relative to the computer 420, although only a memory storage device 450 has been illustrated in FIG. 21. The logical connections depicted in FIG. 21 include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 420, unless indicated otherwise. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A system that navigates a virtual body within a 3D virtual workspace, the system comprising:

an input drive control system that monitors changes in input variables associated with actions of a user input device;

a workspace control system that provides a user with a viewing context comprising a position and orientation associated with states of a plurality of workspace variables, at least one of the workspace variable coupled with the input drive control system, such that a selection of the at least one workspace variables allows for a single input motion of the user input device to change the state of the at least one workspace variable and deselection of the at least one workspace variable changes the position and orientation of the viewing context, wherein the change takes place over time such that the user is made aware of the change in position and orientation of the viewing context, wherein deselection of the user input device causes the position and orientation of the virtual body to glide down to a location within a viewing frustum along a ground plane in the 3D virtual workspace; and a travel control system that couples the at least one of the workspace variables to the input drive control system based on a navigation type, which comprises at least one of speed coupled flying, orbiting, object manipulation technique, ghost copy technique, possession navigation technique, inverse fog technique, inverse scaling technique, and ephemeral world compression.

2. The system of claim 1, the input variables comprising speed, position and selection data.

3. The system of claim 1, the plurality of workspace variables comprising object state, environment state an virtual body state.

4. The system of claim 1, the input variables comprising speed of the user input device and the least one of the plurality of workspace variables comprising the state of the virtual body wherein the forward speed of the input device is coupled to the height and tilt of the virtual body such that the viewing context of the virtual body is continuously updated and moves from a local view to a global view of the 3D virtual workspace.

5. The system of claim 4, the location within a viewing frustum being a bottom of the viewing frustum.

6. The system of claim 4, the location within a viewing frustum being an object in the viewing frustum.

7. The system of claim 4, the height of the virtual body being limited by a ceiling within the 3D virtual workspace.

8. The system of claim 4, the input variables comprising speed, position and selection data and the plurality of workspace variables comprising object state and virtual body state wherein selection of object animates the object to the center of the 3D virtual workspace, dragging the input device forward and backward moves the virtual body toward and away from the object, respectively, and dragging the input device left or right causes the virtual body to orbit around the object.

9. The system of claim 1, the at least one of the plurality of workspace variables being an object state, the input drive control system being coupled to the object state such that an object can be selected creating a copy of the object that is manipulated to a new position and orientation in the 3D virtual workspace wherein the viewing context assumes the new position and orientation of the cop of the object with respect to the object upon deselection of the object.

10. The system of claim 1, the at least one of the plurality of workspace variables being an object state, the input drive control system being coupled to the object state such that an object in a first viewing context can be selected creating a copy of the object that is manipulated to a new position and orientation in the 3D virtual workspace creating a second viewing context with the new position and orientation.

11. The system of claim 10, wherein multiple copies and multiple viewing contexts can be created by manipulating multiple copies of the object to various positions and orientations, each copy being destroyed upon deselection of the object.

12. The system of claim 1, the at least one of the plurality of workspace variables being an object state, the input drive control system being coupled to the object state such that an object in a viewing context can be selected wherein the viewing context is adjusted to the position and orientation of the object, thereby, possessing the object.

13. The system of claim 1, the at least one of the plurality of workspace variables being an object state and virtual body state, the input drive control system being coupled to the object state and the virtual body state such that the state of at least one of objects within and objects outside a radius centered on a virtual body is changed to eliminate occlusions within the viewing context.

14. The system of claim 13, the state of the objects within the radius being changed to a transparent state.

15. The system of claim 13, the state of the objects within the radius being changed to a reduced size state.

16. The system of claim 15, the reduced size state of the object depending on the distance of the object from the virtual body.

17. The system of claim 13, the state of the objects outside the radius being changed to an enlarged size state.

18. The system of claim 17, the enlarged size state of the object depending on the distance of the object from the virtual body.

19. The system of claim 13, the radius being fixed and the virtual body state being movable through the 3D virtual workspace.

20. The system of claim 13, the radius being adjustable and the virtual body state being fixed in the 3D virtual workspace.

21. The s tern of claim 1, the at least one of the plurality of workspace variables being an environment state and a virtual body state, the input drive control system being coupled to the environment state and the virtual body state such that selection of the environment causes a ground plane of the environment to be compressed radially around a virtual body, the virtual body being navigable within the compressed ground plane.

22. A processor controlled display system for displaying a virtual 3D workspace comprising:

a processor;

a user input device coupled to the processor, the user input device providing signals indicating actions and requests of a system user to the processor;

a display device coupled to the processor, the display device being operable to displaying a 3D virtual workspace based on instructions from the processor; and a memory having executable instructions stored therein, the processor in response to the instructions executes animation loop routine which periodically calls one or more workspace routines that provide a viewing context of the 3D virtual workspace on the display device, the viewing context having initial position and orientation associated with the states of a plurality of workspace variables, a least one of the plurality of workspace variables integrated with the user input device based on a navigation type that comprises at least one of speed coupled flying, orbiting, object manipulation technique, ghost copy technique, possession navigation technique, inverse fog technique, inverse scaling technique, and ephemeral world compression, such that a selection of the at least one workspace variables allows for a single input motion of the user input device to change the state of the at least one workspace variable and deselection of the at least one workspace variable changes the position and orientation of the viewing context, wherein the change takes lace over time such that the user is made aware of the change in position and orientation of the viewing context of the 3D virtual workspace on the display device, wherein slowing down of the user input device in a forward direction causes the position and orientation of the virtual body to glide down to a location within a viewing frustum along a around plane in the 3D virtual workspace.

23. The system of claim 22, the at least one of a plurality of workspace variables being the state of a virtual body, the speed of the user input device being coupled to the height and tilt of the virtual body within the 3D virtual workspace such that display is provided with a viewing context from the virtual body that moves from a local view to a global view of the 3D virtual workspace the speed of the user input device is increased.

24. The system of claim 23, the location within a viewing frustum being a bottom of the viewing frustum.

25. The system of claim 23, location within a viewing frustum being an object in the viewing frustum.

26. The system of claim 23, the height of the virtual body being limited by a ceiling within the 3D virtual workspace.

27. The system of claim 23, the plurality of workspace variables comprising object state and virtual body state wherein selection of an object within the 3D virtual workspace with the user input device animates the object to a viewing context in the center of the 3D virtual workspace, dragging the input device forward and backward moves the viewing context from the virtual body toward and away from the object, respectively, and dragging the input device left or right orbits the viewing context from the virtual body around the object.

28. The system of claim 22, the at least one of the plurality of workspace variable being an object state, such that selecting an object within the 3D virtual workspace with the user input device creates a copy of the object that can be manipulated to a new position and orientation in the 3D virtual workspace wherein the viewing context assumes the new position and orientation of the copy of the object with respect to the object upon deselection of the object.

29. The system of claim 22, the at least one of the plurality of workspace variables being an object state, such that selecting an object within the 3D virtual workspace with the user input device creates a copy of the object that can be manipulated to a new position and orientation in the 3D virtual workspace creating a second viewing context with the new position and orientation.

30. The system of claim 29, wherein multiple copies and multiple viewing contexts can be created by manipulating multiple copies of the object to various positions and orientations, each copy being destroyed upon deselection of the object.

31. The system of claim 22, the at least one of the plurality of workspace variables being an object state, such that an object within the 3D virtual workspace can be selected by the us r input device providing a new viewing context having the position and orientation of the selected object, thereby, possessing the object.

32. The system of claim 22, the at least one of the plurality of workspace variables being an object state and a virtual body state, such that the state of at least one of objects within and objects outside a radius centered on a virtual body is changed to eliminate occlusions within the viewing context.

33. The system of claim 32, the state of the objects within the radius being changed to a transparent state.

34. The system of claim 32, the state of the objects within the radius being changed to a reduced size state.

35. The system of claim 34, the reduced size state of an object depending on the distance of the object from the virtual body.

36. The system of claim 32, the state of the objects outside the radius being changed to enlarged size state.

37. The system of claim 36, the enlarged size state of an object depending on the distance of the object from the virtual body.

38. The system of claim 32, the radius being fixed and the virtual body state being movable through the 3D virtual workspace.

39. The system of claim 32, the radius being adjustable and the virtual body state being fixed in the 3D virtual workspace.

40. The system of claim 22, the at least one of the plurality of workspace variables being an environment state and a virtual body state, such that selection of the environment of the 3D virtual workspace causes a ground plane of the 3D virtual workspace to be compressed radially around a viewing context of a virtual body, the virtual body being navigable within the compressed ground plane of the 3D virtual workspace.

41. A computer implemented method for implementing a 3D virtual environment comprising;
    displaying a plurality of virtual 3D objects within a 3D virtual environment, the 3D virtual environment having an initial viewing context with an initial position and orientation from a virtual body;
    determining a navigation type, which comprises at least one of speed coupled flying, orbiting, object manipulation technique, ghost copy technique, possession navigation technique, inverse fog technique, inverse scaling technique, and ephemeral world compression;
    coupling signals associated with actions of a user input device to a state of at least one workspace variable based on the navigation type, the at least one workspace variable being at least one of the plurality of virtual 3D objects, the 3D virtual environment and the virtual body;
    selecting the at least one workspace variable;
    changing the state of the at least one workspace variable in response to actions of the user input device, wherein slowing down a forward speed of the user input device causes the position and orientation of the viewing context from the virtual body to glide down to the bottom of a viewing frustum along a ground plane in the 3D virtual environment;
    deselecting at leas one workspace variable; and
    changing the position and orientation over time of the viewing context of the viewing context based on the changing of the state of the at least one workspace variable.

42. The method of claim 41, wherein coupling signals associated with actions of a user input device to a state of at least one workspace comprising coupling signals associated with actions of user input device to the state of the virtual body, the forward speed of the user input device being coupled to the height and tilt of the virtual body within the 3D virtual environment such that position and orientation of the viewing context from the virtual body moves from a local view to a global view of the 3D virtual environment as the speed of the user input device is increased.

43. The method of claim 42, the location within a viewing frustum being a bottom of the viewing frustum.

44. The method of claim 42, the location within a viewing frustum being an object in the viewing frustum.

45. The method of claim 42, the height of the viewing context being limited by a ceiling within the 3D virtual environment.

46. The method of claim 41, wherein coupling signals associated with actions of a user input device to a stat of at least one workspace comprises coupling signals associated with actions of a user input device to a state of an object and a state of the virtual body wherein selection of an object within the 3D virtual environment animates the object to a viewing context in the center of the 3D virtual environment, dragging the input device forward and backward moves the viewing context from the virtual body toward and away from the object, respectively, and dragging the input de ice left or right orbits the viewing context from the virtual body around the object.

47. The method of claim 41, wherein coupling signals associated with actions of a user input device to a state of at least one workspace comprises coupling signals associated with actions of a user input device to a state of an object, such that selecting the object with the user input device creates a copy of the object that can be manipulated to a new position and orientation in the 3D virtual environment wherein the viewing context assumes the new position and orientation of the copy of the object with respect to the object upon deselection of the object.

48. The method of claim 41, wherein coupling signals associated with actions of a user input device to a state of at least one workspace comprises coupling signals associated with actions of a user input device to a state of an object, such that selecting an object with the user input device creates a copy of the object that can be manipulated to a new position and orientation in the 3D virtual environment creating a second viewing context with the new position and orientation.

49. The method of claim 48, wherein multiple copies and multiple viewing contexts can be created by manipulating multiple copies of the object to various positions and orientations, each copy being destroyed upon deselection of the object.

50. The method of claim 41, wherein coupling signals associated with actions of a user input device to a state of at least one workspace comprises coupling signals associated with actions of a user input device to a state of an object, such that an object within the 3D virtual environment can be selected by the user input device providing a new viewing context having the position and orientation of the selected object, thereby, possessing the object.

51. The method of claim 41, wherein coupling signals associated with actions of a user input device to a state of at least one workspace comprises coupling signals associated with actions of a user input device to a state of at least one object and a state of the virtual body, such that the state of at least one of objects within and objects outside a radius centered on a virtual body is changed to eliminate occlusions within the viewing context.

52. The method of claim 51, the state of the objects within the radius being changed to a transparent state.

53. The method of claim 51, the state of the objects within the radius being changed to a reduced size state.

54. The method of claim 53, the reduced size state of an object depending on the distance of the object from the virtual body.

55. The method of claim 51, the state of the objects outside the radius being changed to an enlarged size state.

56. The method of claim 55, the enlarged size state of an object depending on the distance of the object from the virtual body.

57. The method of claim 51, the radius being fixed and the virtual body state being movable through the 3D virtual environment.

58. The method of claim 51, the radius being adjustable and the virtual body state being fixed in the 3D virtual environment.

59. The method of claim 41, wherein coupling signals associated with actions of a user input device to a state of at least one workspace comprises coupling signals associated with actions of a user input device to a state of the 3D virtual environment and a state of the virtual body, such that selection of the environment causes a ground plane of the 3D virtual environment to be compressed radially around a viewing context of a virtual body, the virtual body being navigable within the compressed ground plane of the 3D virtual environment.

60. The method of claim 41, wherein changing at least one of the position and orientation of the viewing context based on the changing of the state of the at least one workspace variable being accomplished in a single input motion of the user input device.

61. A system that navigates a virtual body within a 3D virtual workspace for identifying objects within the 3D virtual workspace, the system comprising;
   means for displaying a 3D virtual workspace having a plurality of virtual 3D objects and a viewing context from a virtual body, the viewing context having an initial position and orientation;
   means for coupling signals associated with actions of a user input device to a state of at least one workspace variable based on a navigation type that comprises at least one of speed coupled flying, orbiting, object manipulation technique, ghost copy technique, possession navigation technique, inverse fog technique, inverse scaling technique, and ephemeral world compression;
   means for changing the state of the at least one workspace variable in response to actions of the user input device, wherein deselection of the user input device causes the position and orientation of the virtual body to glide down to a location within a viewing frustum along a ground plane in the 3D virtual workspace; and
   means for changing the position and orientation of the viewing context over time based on the changes of the state of the at least one workspace variable.

62. The system of claim 61, the means for coupling signals associated with actions of a user input device to state of at least one workspace variable coupling forward speed of the user input device to the height and tilt of the virtual body within the 3D virtual workspace.

63. The system of claim 61, the means for coupling signals associated with actions of a user input device to state of at least one workspace variable further comprising means for orbiting a selected object.

64. The system of claim 61, the means for coupling signals associated with actions of a user input device to state of at least one workspace variable further comprising means for creating a copy of a selected object that can be manipulated to a new position and orientation in the 3D virtual workspace wherein the viewing context assumes the new position and orientation of the copy of the selected object with respect to the object upon deselection of the object.

65. The system of claim 61, the means for coupling signals associated with actions of a user input device to state of at least one workspace variable further comprising means for creating at least one copy of the object that can be manipulated to a new position and orientation in the 3D virtual workspace creating at least one additional viewing context with the new position and orientation.

66. The system of claim 61, the means for coupling signals associated with actions of a user input device to state of at least one workspace variable further comprising means for possessing an object.

67. The system of claim 61, the means for coupling signals associated with actions of a user input device to state of at least one workspace variable further comprising means for eliminating occlusions within the viewing context.

68. The system of claim 61, the means for coupling signals associated with actions of a user input device to state of at least one workspace variable further comprising means for compressing a ground plane of the 3D virtual workspace around a viewing context of a virtual body.

69. A computer-readable medium having computer-executable for performing the steps comprising;
   displaying a 3D virtual workspace having a plurality of virtual 3D objects and a viewing context from a virtual body, the viewing context having an initial position and orientation;
   coupling signals associated with actions of a user input device to a state of at least one workspace variable base on a navigation type that comprises at least one of speed coupled flying, orbiting, object manipulation technique, ghost copy technique, possession navigation technique, inverse fog technique, inverse scaling technique, and ephemeral world compression;
   changing the state of the at least one workspace variable in response to actions of the user input device, wherein deselection of the user input device causes the position and orientation of the virtual body to glide down to a location within a viewing frustum along a ground plane in the 3D virtual workspace; and
   changing the position and orientation of the viewing context over time based on the changes of the state of the at least one workspace variable.

70. A system that navigates a virtual body within a 3D virtual workspace, the system comprising:
   an input drive control system that receives changes to a speed of a user input device;
   a workspace control system that maintains a viewing context germane to a state of the virtual body that comprises a position and orientation, wherein slowing down a forward speed of the user input device causes the position and orientation of the viewing context from the virtual body to glide down to the bottom of a viewing frustum along a ground plane in the 3D virtual environment; and
   a speed coupled flying navigation component that configures height and tilt of the virtual body based on the forward speed of the input device, such that an increase in speed increases the height and tilt of the virtual body and a decrease in speed decreases the height and tilt of the virtual body.

71. A computer implemented object inspection method for a 3D virtual environment comprising:
   displaying a plurality of virtual three dimensional objects within the 3D virtual environment based on initial position and orientation of the objects;
   selecting at least one of the plurality of objects, which creates a copy of the at least one selected objects;
   manipulating the copy to a new position and orientation in the virtual environment with a user input device, wherein deselection of the user input device causes the position and orientation of the virtual body to glide down to a location within a viewing frustum along a ground plane in the 3D virtual workspace;
   deselecting the at east one of the plurality of objects; and
   animating the change in position and orientation of the objects.

72. A computer-readable medium having computer-executable for performing the steps comprising:
   displaying a viewing context of a 3D virtual workspace based on an initial state of a plurality of virtual 3D objects and an initial state of a virtual body;
   selecting at least one of the plurality of objects; and
   changing the states of the selected objects and the virtual body with the user input device such that dragging the input device forward and backward moves the viewing context from the virtual body toward and way from the object, respectively, and dragging the input device left or right orbits the viewing context from the virtual body around the object, wherein deselection of the user input device causes the position and orientation of the virtual body to glide down to a location within a viewing frustum along a ground plane in the 3D virtual workspace.

73. A system that manipulates virtual objects in a 3D virtual workspace comprising:
   an input drive control system that accommodates changes in input variables associated with actions of a user input device;
   a workspace control system that maintains a viewing context that corresponds to a state of a 3D virtual object that comprises a position and orientation, wherein deselection of the user input device causes the position and orientation of the virtual body to glide down to a location within a viewing frustum along a ground plane in the 3D virtual workspace; and
   a ghost copy navigation component that simultaneously displays a modified viewing context that comprises a plurality of copies of the object in disparate positions and orientations, each copy manipulated to the position and orientation by the input device.

74. A computer implemented navigation method for a 3D virtual environment comprising:
   displaying an initial viewing context of the 3D virtual environment comprising a plurality of virtual 3D objects, each object possesses an object state that comprises a position and orientation;
   selecting at least one of the plurality of objects with a user input device, wherein deselection of the user input device causes the position and orientation of the virtual body to glide down to a location within a viewing frustum along a ground plane in the 3D virtual workspace; and
   displaying a second viewing context of the 3D virtual environment from the position and orientation of the selected object.

75. A system that inspects a 3D virtual workspace comprising:
   means for displaying an initial viewing context of the 3D virtual workspace that comprises a plurality of virtual 3D objects and a virtual body;
   means for reducing occlusions within the viewing context by transforming objects within a radius of a sphere locate on the virtual body employing at least one of the inverse fog technique and the inverse scaling technique;
   means for compressing a ground plane of the 3D virtual workspace radially around the virtual body; and
   means for displaying the radially compressed 3D virtual workspace including objects located behind the virtual body.

76. A system that inspects a 3D virtual workspace comprising:
- means for displaying an initial viewing context of the 3D virtual workspace that comprises a plurality of virtual 3D objects and a virtual body;
- means for controlling a radius of a sphere centered on the virtual body; and
- means for reducing occlusions within the viewing context by transforming objects within the radius employing at least one of the inverse fog technique and the inverse scaling technique.

* * * * *

UNITED STATES PATENT AND TRADEMARK OFFICE
CERTIFICATE OF CORRECTION

PATENT NO. : 6,987,512 B2 Page 1 of 2
APPLICATION NO. : 09/821126
DATED : January 17, 2006
INVENTOR(S) : George G. Robertson et al.

It is certified that error appears in the above-identified patent and that said Letters Patent is hereby corrected as shown below:

In column 14, line 65, in Claim 1, delete "variable" and insert -- variables --, therefor.

In column 15, line 21, in Claim 3, delete "an" and insert -- and --, therefor.

In column 15, line 24, in Claim 4, delete "least" and insert -- at least --, therefor.

In column 15, line 40, in Claim 8, after "of" insert -- an --.

In column 15, line 52, in Claim 9, delete "cop" and insert -- copy --, therefor.

In column 16, line 6, in Claim 13, after "and" insert -- a --.

In column 16, line 30, in Claim 21, delete "s tern" and insert -- system --, therefor.

In column 16, line 48, in Claim 22, after "executes" insert -- an --.

In column 16, line 52, in Claim 22, after "having" insert -- an --.

In column 16, line 54, in Claim 22, delete "a least" and insert -- at least --, therefor.

In column 16, line 66, in Claim 22, delete "lace" and insert -- place --, therefor.

In column 17, line 6, in Claim 22, delete "around" and insert -- ground --, therefor.

In column 17, line 13, in Claim 23, after "workspace" insert -- as --.

In column 17, line 17, in Claim 25, insert -- the -- before "location".

In column 17, line 31, in Claim 28, delete "variable" and insert -- variables --, therefor.

In column 17, line 53, in Claim 31, delete "us r" and insert -- user --, therefor.

In column 18, line 2, in Claim 36, after "to" insert -- an --.

In column 18, line 46, in Claim 41, delete "leas" and insert -- least --, therefor.

In column 18, line 54, in Claim 42, insert -- a -- before "user".

In column 19, line 2, in Claim 46, delete "stat" and insert -- state --, therefor.

UNITED STATES PATENT AND TRADEMARK OFFICE
CERTIFICATE OF CORRECTION

PATENT NO. : 6,987,512 B2
APPLICATION NO. : 09/821126
DATED : January 17, 2006
INVENTOR(S) : George G. Robertson et al.

It is certified that error appears in the above-identified patent and that said Letters Patent is hereby corrected as shown below:

In column 19, line 10, in Claim 46, delete "de ice" and insert -- device --, therefor.

In column 20, line 43, in Claim 62, after "to" insert -- a --.

In column 20, line 48, in Claim 63, after "to" insert -- a --.

In column 20, line 52, in Claim 64, after "to" insert -- a --.

In column 20, line 60, in Claim 65, after "to" insert -- a --.

In column 20, line 67, in Claim 66, after "to" insert -- a --.

In column 21, line 4, in Claim 67, after "to" insert -- a --.

In column 21, line 8, in Claim 68, after "to" insert -- a --.

In column 21, line 19, in Claim 69, delete "base" and insert -- based --, therefor.

In column 21, line 67, in Claim 71, delete "east" and insert -- least --, therefor.

In column 22, line 12, in Claim 72, delete "way" and insert -- away --, therefor.

In column 22, line 60, in Claim 75, delete "locate" and insert -- located --, therefor.

Signed and Sealed this

Eleventh Day of August, 2009

David J. Kappos
*Director of the United States Patent and Trademark Office*